(12) United States Patent
Zhang et al.

(10) Patent No.: US 11,930,176 B2
(45) Date of Patent: Mar. 12, 2024

(54) CONTEXT MODELING AND SELECTION OF MULTIPLE TRANSFORM MATRIX

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/406,315

(22) Filed: Aug. 19, 2021

(65) Prior Publication Data
US 2022/0295061 A1      Sep. 15, 2022

Related U.S. Application Data

(63) Continuation of application No. PCT/CN2020/086354, filed on Apr. 23, 2020.

(30) Foreign Application Priority Data

Apr. 23, 2019   (WO) ................ PCT/CN2019/083844

(51) Int. Cl.
*H04N 19/12* (2014.01)
*H04N 19/159* (2014.01)
(Continued)

(52) U.S. Cl.
CPC ........... *H04N 19/12* (2014.11); *H04N 19/159* (2014.11); *H04N 19/176* (2014.11);
(Continued)

(58) Field of Classification Search
None
See application file for complete search history.

(56) References Cited

U.S. PATENT DOCUMENTS 9,219,915 B1    12/2015    Sebastiaan et al.
9,661,338 B2     5/2017    Karczewicz et al.
(Continued)

FOREIGN PATENT DOCUMENTS

CN    102308578 A    1/2012
CN    103780910 A    5/2014
(Continued)

OTHER PUBLICATIONS

Saxena et al., "Rext: On Transform Selection for Intra-Block Copy Blocks," JCTVC-O0053, 3 pp. (Oct. 2013).*
(Continued)

*Primary Examiner* — Michael J Hess
(74) *Attorney, Agent, or Firm* — Perkins Coie LLP

(57)  ABSTRACT

Devices, systems and methods for digital video coding, which includes context modeling and multiple transform matrix selection, are described. An exemplary method for video processing includes determining, for a conversion between a current video block of a video and a bitstream representation of the video, that an indication of a transform type in a multiple transform selection (MTS) operation is excluded from the bitstream representation, and wherein the current video block is coded using an intra block copy mode, and performing the conversion, wherein the indication is in a sequence parameter set, a picture parameter set, a tile group header, a slice header, a picture header, a tile header, a coding tree unit row, or a video data unit, and wherein the MTS operation includes using a transform from a plurality
(Continued)

of predefined transform candidates for transforming a prediction error of the current video block during the conversion.

20 Claims, 18 Drawing Sheets

(51) Int. Cl.
  *H04N 19/176* (2014.01)
  *H04N 19/186* (2014.01)
  *H04N 19/61* (2014.01)
  *H04N 19/625* (2014.01)
  *H04N 19/70* (2014.01)

(52) U.S. Cl.
  CPC ........... *H04N 19/186* (2014.11); *H04N 19/61* (2014.11); *H04N 19/625* (2014.11); *H04N 19/70* (2014.11)

(56) References Cited

U.S. PATENT DOCUMENTS

| | | | |
|---|---|---|---|
| 10,230,983 | B2 | 3/2019 | Liu et al. |
| 10,419,763 | B2 | 9/2019 | Huang et al. |
| 10,440,399 | B2 | 10/2019 | Karczewicz et al. |
| 10,477,214 | B2 | 11/2019 | Zhang et al. |
| 2014/0362917 | A1* | 12/2014 | Joshi ............... H04N 19/129 375/240.12 |
| 2015/0264354 | A1 | 9/2015 | Zhang et al. |
| 2016/0100175 | A1* | 4/2016 | Laroche ............ H04N 19/192 375/240.18 |
| 2016/0100179 | A1 | 4/2016 | He et al. |
| 2016/0100190 | A1 | 4/2016 | Zhang et al. |
| 2016/0227244 | A1* | 8/2016 | Rosewarne ........... H04N 19/70 |
| 2016/0241852 | A1* | 8/2016 | Gamei ................ H04N 19/50 |
| 2016/0269732 | A1* | 9/2016 | Li ..................... H04N 19/136 |
| 2017/0280163 | A1* | 9/2017 | Kao .................. H04N 19/60 |
| 2017/0374369 | A1* | 12/2017 | Chuang .............. H04N 19/593 |
| 2018/0020218 | A1* | 1/2018 | Zhao .................. H04N 19/103 |
| 2018/0098081 | A1 | 4/2018 | Zhao et al. |
| 2018/0234702 | A1 | 8/2018 | Jiung et al. |
| 2018/0332289 | A1 | 11/2018 | Huang |
| 2019/0158854 | A1 | 5/2019 | He et al. |
| 2020/0186837 | A1* | 6/2020 | Zhao ................. H04N 19/12 |
| 2021/0243475 | A1* | 8/2021 | Tsukuba .............. H04N 19/61 |

FOREIGN PATENT DOCUMENTS

| | | |
|---|---|---|
| CN | 107211144 A | 9/2017 |
| CN | 108419077 A | 8/2018 |
| CN | 108886613 A | 11/2018 |
| CN | 109089117 A | 12/2018 |
| TW | 201842770 A | 12/2018 |
| WO | 2017162068 A1 | 9/2017 |
| WO | 2017171370 A1 | 10/2017 |
| WO | 2018123644 A1 | 7/2018 |
| WO | 2018143496 A1 | 8/2018 |
| WO | 2018160231 A1 | 9/2018 |
| WO | 2018161954 A1 | 9/2018 |
| WO | 2019074291 A1 | 4/2019 |

OTHER PUBLICATIONS

Li et al., "Description of Screen Content Coding Technology Proposal by Microsoft," JCTVC-Q0035, 27 pp. (Mar. 2014).*
Flynn et al., "BoG report on Range Extensions topics," JCTVC-O0352, 48 pp. (Oct. 2013).*
Bross et al., "Non-CE8: Unified Transform Type Signalling and Residual Coding for Transform Skip," JVET-M0464-v4, 13th Meeting: Marrakech, MA Jan. 9-18, 2019.*
Chiang et al., "CE6-related: Unified implicit MTS between ISP mode and regular intra mode," JVET-N0089-v2, 14th Meeting: Geneva, CH, Mar. 19-27, 2019.*
Clare et al., "CE8: BDPCM with harmonized residual coding and CCB limitation (CE8-3.1a, CE8-3.1b, CE8-5.1a, CE8-5.1b)," JVET-N0214, 14th Meeting: Geneva, CH, Mar. 19-27, 2019.*
Abdoli et al. ""CE8: BDPCM with Horizontal/Vertical Predictor and Independently Decodable Areas (test 8.3.1b),"" Joint Video Experts Team (JVET)of ITU-T SG 16 WP 3 and ISO/IEC JTC 1/SC 29/WG 1113th Meeting: Marrakech, MA, Jan. 9-18, 2019, document JVET-M0057, 2019.
Bross et al. "Non-CE8: Unified Transform Type Signalling and Residual Coding for Transform Skip Mode," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0464, 2019.
Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N1001, 2019.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
Chen et al.CE4: Affine Merge Enhancement with Simplification (Test 4.2.2), Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0368, 2018.
De-Luxan-Hernandez et al. "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0102, 2019.
"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.
Karczewicz et al. "CE8-Related: Quantized Residual BDPCM," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0413, 2019.
Koo et al. "CE6-2.1: Reduced Secondary Transform (RST)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0133, 2018.
Lainema, Jani. ""CE6-related: Shape Adaptive Transform Selection,"" Joint Video Experts Team (JVET) of ITU-T SG 16 WP 3 and ISO/IEC JTC 1/SC 29/WG 1112th Meeting: Macao, CN, Oct. 3-12, 2018, document JVET-L0134, 2018.
Lainema, Jani. "CE6: Shape Adaptive Transform Selection (Test 3.1)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0303, 2019.
Liao et al. "CE10.3.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124, 2018.
Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2016, document JCTVC-Y1002, 2016.
Salehifar et al. "CE 6.2.6: Reduced Secondary Transform (RST)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0099, 2018.
Pfaff et al. "CE3: Affine Linear Weighted Intra Prediciton (CE3-4.1, CE3-4.2)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0217, 2019.
JEM-7.0: https://jvet.hhi.fraunhofer.de/svn/svn_HMJEMSoftware/tags/ HM-16.6-JEM-7.0.
International Search Report and Written Opinion from International Patent Application No. PCT/CN2020/086354 dated Jul. 14, 2020 (10 pages).

(56) References Cited

OTHER PUBLICATIONS

International Search Report and Written Opinion from International Patent Application No. PCT/CN2020/086370 dated Jul. 14, 2020 (9 pages).
Bross et al. "Versatile Video Coding (Draft 4)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M1001, 2019. (cited in CN202080030909.5 OA dated Aug. 23, 2022).
Lee et al. "Fast Transform Skip Mode Decision for HEVC Screen Content Coding," 2015 IEEE International Symposium on Broadmand Multimedia Systems and Broadcasting, IEEE, Jun. 17, 2015, pp. 1-4 XP033188438. (cited in EP20796393.5 EESR dated Oct. 19, 2022).
Extended European Search Report from European Patent Application No. 20796393.5 dated Oct. 19, 2022 (11 pages).
Zhang et al. "CE6 Related: On Index Signalling of Multiple Transform Selection," Joint Video Experts Team (JVET) of ITU-T SG 16 WP 3 and ISO/IEC JTC 1/SC 29/WG 11 12th Meeting, Macao, CN, Oct. 3-12, 2018, document JVET-L0331, 2018. (cited in JP2021-562775 OA dated Dec. 6, 2022).

* cited by examiner

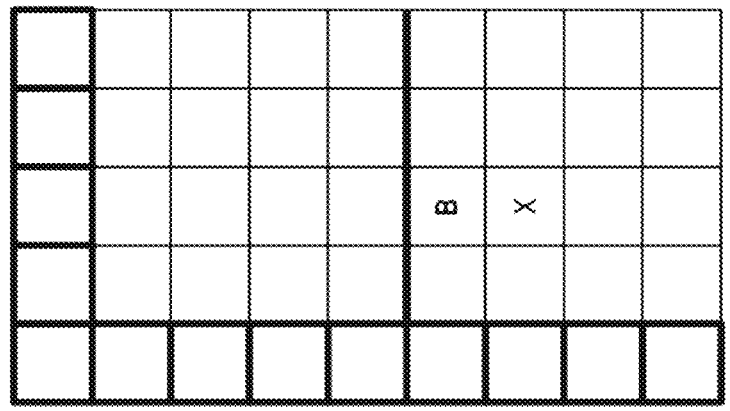
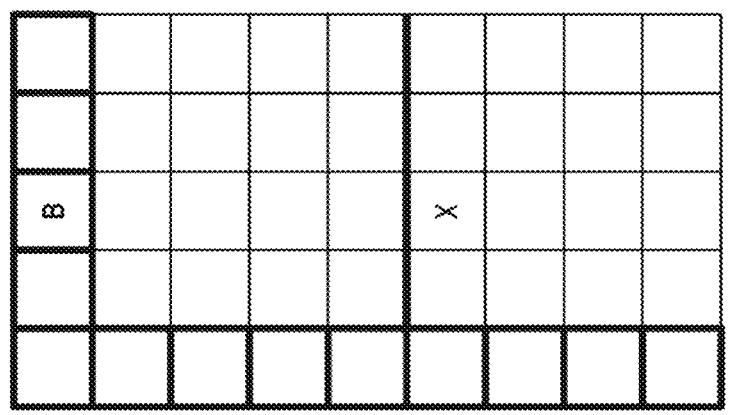
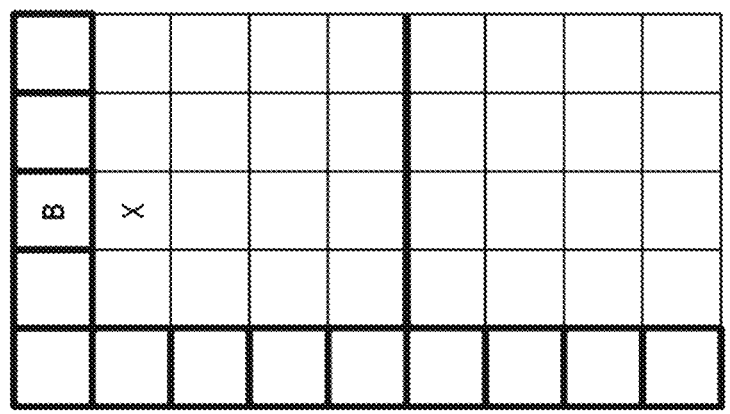
FIG. 6

FIG. 7

CONTEXT MODELING AND SELECTION OF MULTIPLE TRANSFORM MATRIX

CROSS-REFERENCE TO RELATED APPLICATION

This application is a continuation of International Patent Application No. PCT/CN2020/086354, filed on Apr. 23, 2020, which claims the priority to and benefits of International Patent Application No. PCT/CN2019/083844 filed on Apr. 23, 2019. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to context modeling and multiple transform matrix selection for video coding. The described methods may be applied to both the existing video coding standards (e.g., High Efficiency Video Coding (HEVC)) and future video coding standards or video codecs.

In one representative aspect, the disclosed technology may be used to provide a method for video processing. This method includes determining, for a conversion between a current video block of a video and a bitstream representation of the video, that an indication of a transform type in a multiple transform selection (MTS) operation is excluded from the bitstream representation, and wherein the current video block is coded using an intra block copy (IBC) mode, and performing the conversion, wherein the indication is in a sequence parameter set (SPS), a picture parameter set (PPS), a tile group header, a slice header, a picture header, a tile header, a coding tree unit (CTU) row, a coding unit, or a video data unit, and wherein the MTS operation comprises using a transform from a plurality of predefined transform candidates for transforming a prediction error of the current video block during the conversion.

In another representative aspect, the disclosed technology may be used to provide a method for video processing. This method includes making a decision, based on a coding mode of a current video block of a video, regarding a selective application of a multiple transform selection (MTS) operation, and performing, based on the decision, a conversion between the current video block and a bitstream representation of the video, wherein the MTS operation comprises using a transform from a plurality of predefined transform candidates for transforming a prediction error of the current video block during the conversion.

In yet another representative aspect, the disclosed technology may be used to provide a method for video processing. This method includes configuring, based on a characteristic of a current video block, a context model for coding at least one index of a multiple transform selection (MTS) operation, and performing, based on the configuring, a conversion between the current video block and a bitstream representation of a video comprising the current video block, wherein the MTS operation comprises using a transform from a plurality of predefined transform candidates for transforming a prediction error of the current video block during the conversion.

In yet another representative aspect, the disclosed technology may be used to provide a method for video processing. This method includes determining, during a conversion between a current video block and a bitstream representation of a video comprising the current video block, that the conversion comprises a multiple transform selection (MTS) operation, and coding, based on the determining, one or more horizontal indices and one or more vertical indices of matrices of the MTS operation separately, wherein the MTS operation comprises using a transform from a plurality of predefined transform candidates for transforming a prediction error of the current video block during the conversion.

In yet another representative aspect, the disclosed technology may be used to provide a method for video processing. This method includes configuring, for a conversion between a current video block of a video and a bitstream representation of the video, an indication of a transform type in a multiple transform selection (MTS) operation for the current video block that is coded using an intra block copy (IBC) mode, and performing the conversion, wherein the indication is in a sequence parameter set (SPS), a picture parameter set (PPS), a tile group header, a slice header, a picture header, a tile header, a coding tree unit (CTU) row, or a video data unit, and wherein the MTS operation comprises using a transform from a plurality of predefined transform candidates for transforming a prediction error of the current video block during the conversion.

In yet another representative aspect, the disclosed technology may be used to provide a method for video processing. This method includes determining, for a conversion between a current video block of a video and a bitstream representation of the video, whether an indication of a transform type in a multiple transform selection (MTS) operation is excluded from the bitstream representation for the current video block, and performing the conversion, wherein the indication is in a sequence parameter set (SPS), a picture parameter set (PPS), a tile group header, a slice header, a picture header, a tile header, a coding tree unit (CTU) row, a coding unit, or a video data unit, wherein the determining is based on a last position of a non-zero coded coefficient, and wherein the MTS operation comprises using a transform from a plurality of predefined transform candidates for transforming a prediction error of the current video block during the conversion.

In yet another representative aspect, the disclosed technology may be used to provide a method for video processing. This method includes configuring, for a conversion between a current video block of a video and a bitstream representation of the video, an indication of using a multiple transform selection (MTS) operation for a chroma component of the current video block, and performing the conversion, wherein the configuring is based on a color format of the current video block, and wherein the MTS operation comprises using a transform from a plurality of predefined transform candidates for transforming a prediction error of the current video block during the conversion.

In yet another representative aspect, the disclosed technology may be used to provide a method for video processing. This method includes determining, for a conversion between a current video block of a video and a bitstream representation of the video, that a sub-block transform (SBT) operation is applied for the current video block, and performing the conversion by using a multiple transform selection (MTS) operation, wherein the SBT operation comprises a position-dependent transform operation, and wherein the MTS operation comprises using a transform from a plurality of predefined transform candidates for transforming a prediction error of the current video block during the conversion.

In yet another representative aspect, the disclosed technology may be used to provide a method for video processing. This method includes making a decision, based on a color format of a current video block of a video, regarding a selective application of an intra sub-block partitioning (ISP) operation to a chroma component of the current video block, and performing, based on the decision, a conversion between the current video block and a bitstream representation of the video, wherein the ISP operation comprises dividing blocks vertically or horizontally into sub-partitions that have at least a predetermined number of samples.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 6 shows an example of dividing a block of 4×8 samples into two independently decodable areas.

FIG. 7 shows an example of the order of processing of the rows of pixels to maximize throughput for 4×N blocks with vertical predictor.

FIGS. 8A-8I show flowcharts of example methods for video processing.

DETAILED DESCRIPTION

Figure 1:
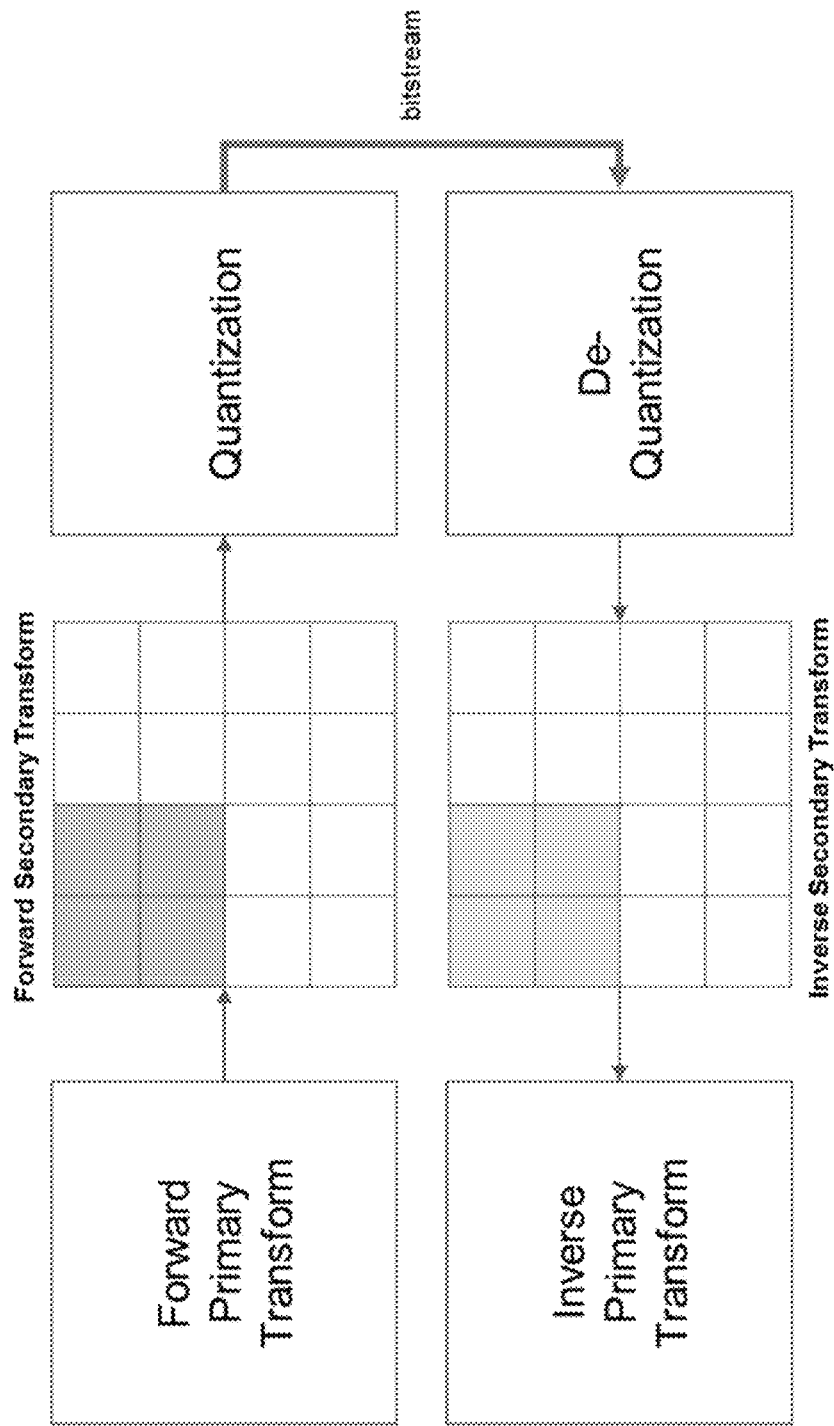
FIG. 1 shows an example of a secondary transform in JEM.
Figure 2:
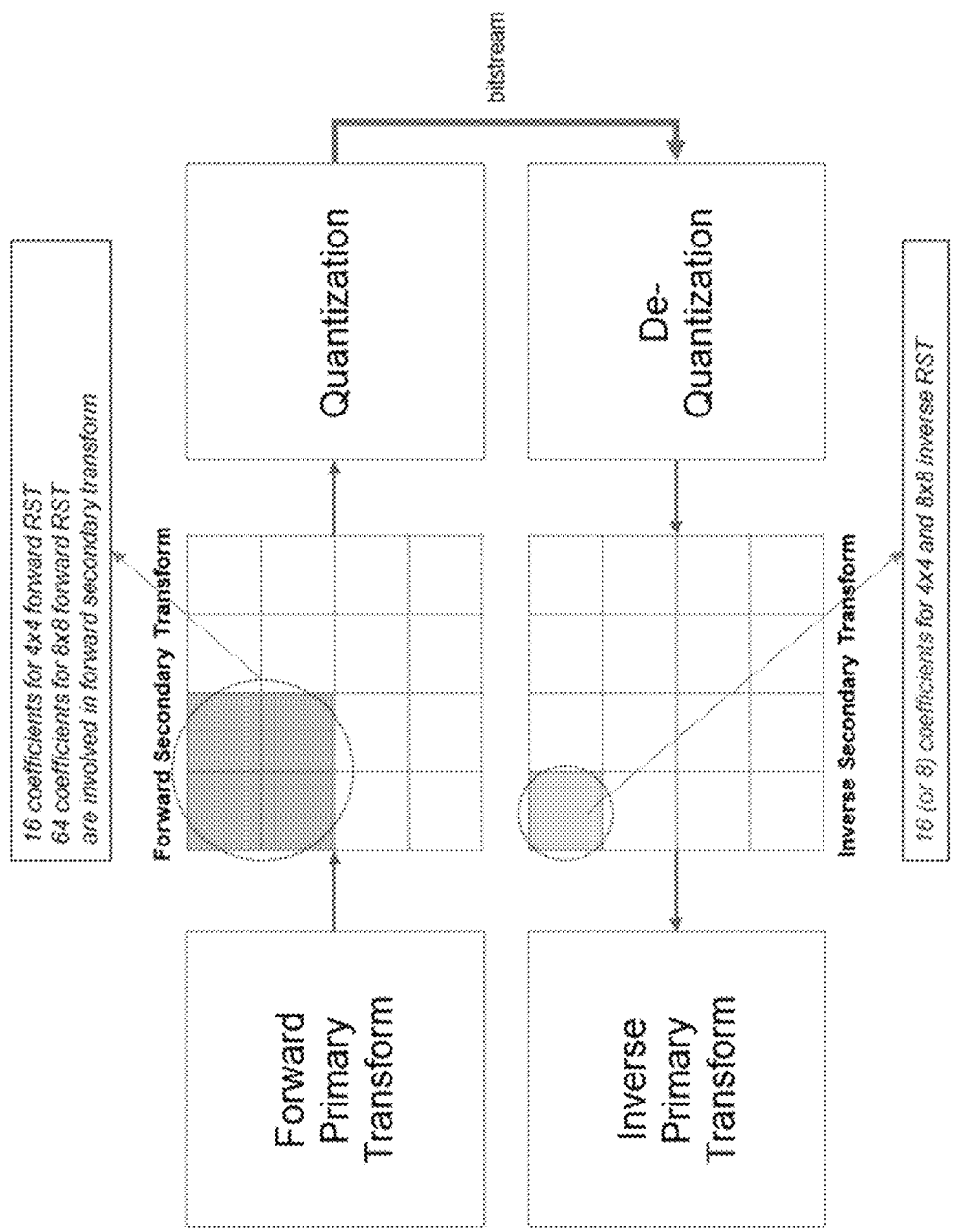
FIG. 2 shows an example of the proposed reduced secondary transform (RST).

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

2 Video Coding Introduction

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Discrete Sinusoidal Transform Families

The discrete sinusoidal transform families include the well-known discrete Fourier, cosine, sine, and the Karhunen-Loeve (under first-order Markov condition) transforms. Among all the members, there are 8 types of transforms based on cosine functions and 8 types of transforms based on sine functions, namely DCT-I, II, . . . , VIII, and DST-I, II, . . . , VIII, respectively. These variants of discrete cosine and sine transforms originate from the different symmetry of their corresponding symmetric-periodic sequences. The transform basis functions of selected types of DCT and DST, as utilized in the proposed methods, are formulated in below Table 1.

TABLE 1

Transform basis functions of DCT-II/V/VIII and DST-I/VII for N-point input

| Transform Type | Basis function $T_i(j)$, $i, j = 0, 1, \ldots, N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ where $\omega_0 = \begin{cases} \sqrt{\frac{2}{N}} & i = 0 \\ 1 & i \neq 0 \end{cases}$ |

TABLE 1-continued

Transform basis functions of DCT-II/V/VIII and DST-I/VII for N-point input

| Transform Type | Basis function $T_i(j)$, $i, j = 0, 1, \ldots, N-1$ |
|---|---|
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, where $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

2.2 Transform Design in HEVC/H.265

The HEVC standard specifies core transform matrices of size 4×4, 8×8, 16×16, and 32×32 to be used for two-dimensional transforms in the context of block-based motion-compensated video compression Like previous video coding standards, HEVC specifies two-dimensional transforms resembling the inverse discrete cosine transform (IDCT) for all transform sizes. Multiple transform sizes improve compression performance, but also increase the implementation complexity.

As we know, Discrete Sine Transform Type VII (DST-VII) approximates the optimal transform better than DCT-II along the prediction direction. In HEVC, 4×4 DST-VII has been adopted for coding luma Intra prediction residuals.

Differences compared to the standard, e.g., the VTM-2 standard, are demarcated using double bolded parentheses, i.e., ((a)) denotes that "a" has been added.

7.3.2.3.1 General Picture Parameter Set RBSP Syntax

| | Descriptor |
|---|---|
| pic_parameter_set_rbsp( ) { | |
|   pps_pic_parameter_set_id | ue(v) |
|   pps_seq_parameter_set_id | ue(v) |
|   ... | |
|   constrained_intra_pred_flag | u(1) |
|   (( transform_skip_enabled_flag | u(1) )) |
|   cu_qp_delta_enabled_flag | u(1) |
|   if( cu_qp_delta_enabled_flag ) | |
|     diff_cu_qp_delta_depth | ue(v) |
|   pps_cb_qp_offset | se(v) |
|   pps_cr_qp_offset | se(v) |
|   ... | |
|   rbsp_trailing_bits( ) | |
| } | |

7.3.2.3.2 Picture Parameter Set Range Extension Syntax

| | Descriptor |
|---|---|
| pps_range_extension( ) { | |
| (( if( transform_skip_enabled_flag ) | |
|   log2_max_transform_skip_block_size_minus2 | ue(v) )) |
| cross_component_prediction_enabled_flag | u(1) |
| chroma_qp_offset_list_enabled_flag | u(1) |
| if( chroma_qp_offset_list_enabled_flag ) { | |
|   diff_cu_chroma_qp_offset_depth | ue(v) |
|   chroma_qp_offset_list_len_minus1 | ue(v) |
|   for( i = 0; i <= chroma_qp_offset_list_len_minus1; i++ ) { | |
|     cb_qp_offset_list[ i ] | se(v) |
|     cr_qp_offset_list[ i ] | se(v) |
|   } | |
| } | |
| log2_sao_offset_scale_luma | ue(v) |
| log2_sao_offset_scale_chroma | ue(v) |
| } | |

| | Descriptor |
|---|---|
| sps_range_extension( ) { | |
| (( transform_skip_rotation_enabled_flag | u(1) |
|   transform_skip_context_enabled_flag | u(1) )) |
|   implicit_rdpcm_enabled_flag | u(1) |
|   explicit_rdpcm_enabled_flag | u(1) |
|   extended_precision_processing_flag | u(1) |
|   intra_smoothing_disabled_flag | u(1) |
|   high_precision_offsets_enabled_flag | u(1) |
|   persistent_rice_adaptation_enabled_flag | u(1) |
|   cabac_bypass_alignment_enabled_flag | u(1) |
| } | |

7.3.8.11 Residual Coding Syntax

| | Descriptor |
|---|---|
| residual_coding( x0, y0, log2TrafoSize, cIdx) { | |
| (( if( transform_skip_enabled_flag && | |
|   !cu_transquant_bypass_flag && | |
|   ( log2TrafoSize <= Log2MaxTransformSkipSize ) ) | |
|   transform_skip_flag[ x0 ][ y0 ][ cIdx ] | ae(v) )) |
| if( CuPredMode[ x0 ][ y0 ] == MODE_INTER && | |
| explicit_rdpcm_enabled_flag && | |
|   ( transform_skip_flag[ x0 ][ y0 ][ cIdx ] | | | |
| cu_transquant_bypass_flag ) ) { | |
|   explicit_rdpcm_flag[ x0 ][ y0 ][ cIdx ] | ae(v) |
|   if( explicit_rdpcm_flag[ x0 ][ y0][ cIdx ] ) | |
|     explicit_rdpcm_dir_flag[ x0 ][ y0 ][ cIdx ] | ae(v) |
| } | |
| last_sig_coeff_x_prefix | ae(v) |
| last_sig_coeff_y_prefix | ae(v) |
| if( last_sig_coeff_x_prefix > 3 ) | |
|   last_sig_coeff_x_suffix | ae(v) |
| if( last_sig_coeff_y_prefix > 3 ) | |
|   last_sig_coeff_y_suffix | ae(v) |
| lastScanPos = 16 | |
| lastSubBlock = ( 1 << ( log2TrafoSize − 2 ) ) * ( 1 << ( log2TrafoSize − 2 ) ) − 1 | | transform_skip_rotation_enabled_flag equal to 1 specifies that a rotation is applied to the residual data block for intra 4×4 blocks coded using a transform skip operation. transform_skip_rotation_enabled_flag equal to 0 specifies that this rotation is not applied. When not present, the value of transform_skip_rotation_enabled_flag is inferred to be equal to 0.

transform_skip_context_enabled_flag equal to 1 specifies that a particular context is used for the parsing of the sig_coeff_flag for transform blocks with a skipped transform. transform_skip_context_enabled_flag equal to 0 specifies that the presence or absence of transform skipping or a transform bypass for transform blocks is not used in the context selection for this flag. When not present, the value of transform_skip_context_enabled_flag is inferred to be equal to 0.

2.3 MTS in VVC Working Draft 3

In the multiple transform selection (MTS) technology, a group of alternative transforms are pre-defined. The encoder is empowered to select a transform from multiple predefined candidates and explicitly signal the selection into the bitstream. It is motivated by the observations that, the residual statistics can still vary significantly even for a single prediction direction.

2.3.1 Multiple Transform Selection in VTM3

In current VVC design, the MTS applies to the luma coding units (CUs) with both width and height smaller than or equal to 64, and whether MTS applies or not is controlled by a CU level flag, named tu_mts_flag. When the CU level flag is equal to 0, a default transform, DCT-II, is applied in the CU to encode the residue. For luma coding block within an MTS enabled CU, two additional flags are signalled to identify the horizontal and vertical transform to be used, respectively. Each flag is coded with one bit to indicate whether DST-VII or DCT-VIII is utilized.

In addition to DCT-2 transform, DST-7 and DCT-8 could also be applied. For either horizontal or vertical transform, a 1-bit flag is transmitted to the decoder side, named mts_idx. The mapping between mts_idx and transform matrix is tabulated in Table 2.

TABLE 2

List of allowed transform matrix

| ALLOWED Transform | |
|---|---|
| Intra | Inter |
| DST-VII | DST-VII |
| DST-VIII | DST-VIII |

2.3.2 Syntax Elements of MTS 7.3.2.1 Sequence Parameter Set RBSP Syntax

| | Descriptor |
|---|---|
| seq_parameter_set_rbsp( ) { | |
|   sps_seq_parameter_set_id | ue(v) |
|   chroma_format_idc | ue(v) |
|   if( chroma_format_idc = = 3 ) | |
|     separate_colour_plane_flag | u(1) |
|   ... | |
|   if( sps_affine_enabled_flag ) | |
|     sps_affine_type_flag | u(1) |
| (( sps_mts_intra_enabled_flag | u(1) |
|   sps_mts_inter_enabled_flag | u(1) )) |
|   sps_ladf_enabled_flag | u(1) |
|   if ( sps_ladf_enabled_flag ) { | |
|   ... | |
|   } | |
| } | |
| rbsp_trailing_bits( ) | |
| } | |

7.3.4.10 Transform Unit Syntax

| | Descriptor |
|---|---|
| transform_unit( x0, y0, tbWidth, tbHeight, treeType ) { | |
|   if( treeType = = SINGLE_TREE \| \| treeType = = DUAL_TREE_LUMA ) | |
|     tu_cbf_luma[ x0 ][ y0 ] | ae(v) |
|   if( treeType = = SINGLE_TREE \| \| treeType = = DUAL_TREE_CHROMA ) { | |
|     tu_cbf_cb[ x0 ][ y0 ] | ae(v) |
|     tu_cbf_cr[ x0 ][ y0 ] | ae(v) |
|   } | |
| ((   if( ( ( ( CuPredMode[ x0 ][ y0 ] = = MODE_INTRA ) && sps_mts_intra_enabled_flag ) \| \| | |
|     ( ( CuPredMode[ x0 ][ y0 ] = = MODE_INTER ) && sps_mts_inter_enabled_flag ) ) | |
|     && tu_cbf_luma[ x0 ][ y0 ] && treeType != DUAL_TREE_CHROMA | |
|     && ( tbWidth <= 32 ) && ( tbHeight <= 32 ) ) | |
|     tu_mts_flag[ x0 ][ y0 ] )) | ae(v) |
|   if( tu_cbf_luma[ x0 ][ y0 ] ) | |
|     residual_coding( x0, y0, log2( tbWidth ), log2( tbHeight ), 0 ) | |
|   if( tu_cbf_cb[ x0 ][ y0 ] ) | |
|     residual_coding( x0, y0, log2( tbWidth / 2 ), log2( tbHeight / 2 ), 1 ) | |
|   if( tu_cbf_cr[ x0 ][ y0 ] ) | |
|     residual_coding( x0, y0, log2( tbWidth / 2 ), log2( tbHeight / 2 ), 2 ) | |
| } | |

7.3.4.11 Residual Coding Syntax

| | Descriptor |
|---|---|
| residual_coding( x0, y0, log2TbWidth, log2TbHeight, cIdx ) { | |
| ((   if( transform_skip_enabled_flag && ( cIdx != 0 \| \| tu_mts_flag[ x0 ][ y0 ] = = 0 ) && | |
|     ( log2TbWidth <= 2) && ( log2TbHeight <= 2 ) ) | |
|     transfer in_skip_flag[ x0 ][ y0 ][ cIdx ] | ae(v) )) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2SbSize = ( Min( log2TbWidth, log2TbHeight ) < 2 ? 1 : 2 ) | |
|   numSbCoeff = 1 << ( log2SbSize << 1 ) | |
|   lastScanPos = numSbCoeff | |

-continued

|  | Descriptor |
|---|---|
| ```
lastSubBlock = ( 1 << ( log2TbWidth + log2TbHeight − 2 * log2SbSize ) ) − 1
do {
  if( lastScanPos = = 0 ) {
    lastScanPos = numSbCoeff
    lastSubBlock− −
  }
  lastScanPos− −
  xS = DiagScanOrder[ log2TbWidth − log2SbSize ][ log2TbHeight − log2SbSize ]
        [ lastSubBlock ][ 0 ]
  yS = DiagScanOrder[ log2TbWidth − log2SbSize ][ log2TbHeight − log2SbSize ]
        [ lastSubBlock ][ 1 ]
  xC = ( xS << log2SbSize ) +
        DiagScanOrder[ log2SbSize ][ log2SbSize ][ lastScanPos ][ 0 ]
  yC = ( yS << log2SbSize ) +
        DiagScanOrder[ log2SbSize ][ log2SbSize ][ lastScanPos ][ 1 ]
} while( ( xC != LastSignificantCoeffX ) | | ( yC != LastSignificantCoeffY ) )
numSigCoeff = 0
QState = 0
for( i = lastSubBlock; i >= 0; i− − ) {
  ...
  }
(( if( tu_mts_flag[ x0 ][ y0 ] && ( cIdx = = 0 ) )
    mts_idx[ x0 ][ y0 ][ cIdx ]
}
``` | ae(v) )) |

2.3.3 Semantics of MTS Syntax Elements sps_mts_intra_enabled_flag equal to 1 specifies that tu_mts_flag may be present in the residual coding syntax for intra coding units. sps_mts_intra_enabled_flag equal to 0 specifies that tu_mts_flag is not present in the residual coding syntax for intra coding units.

sps_mts_inter_enabled_flag specifies that tu_mts_flag may be present in the residual coding syntax for inter coding units. sps_mts_inter_enabled_flag equal to 0 specifies that tu_mts_flag is not present in the residual coding syntax for inter coding units.

tu_mts_flag[x0][y0] equal to 1 specifies that multiple transform selection is applied to the residual samples of the associated luma transform block. tu_mts_flag[x0][y0] equal to 0 specifies that multiple transform selection is not applied to the residual samples of the associated luma transform block. The array indices x0, y0 specify the location (x0, y0) of the top-left luma sample of the considered transform block relative to the top-left luma sample of the picture. When tu_mts_flag[x0][y0] is not present, it is inferred to be equal to 0.

mts_idx[x0][y0][cIdx] specifies which transform kernels are applied to the residual samples along the horizontal and vertical direction of the current transform block. The array indices x0, y0 specify the location (x0, y0) of the top-left luma sample of the considered transform block relative to the top-left luma sample of the picture the array index cIdx specifies an indicator for the colour component; it is equal to 0 for luma, equal to 1 for Cb and equal to 2 for Cr.

When mts_idx[x0][y0][cIdx] is not present, it is inferred to be equal to −1.

TABLE 8-9

Specification of trTypeHor and trTypeVer depending on mts_idx[ x ][ y ][ cIdx ]

| mts_idx[ xTbY ][ yTbY ] | trTypeHor (Horizontal transform matrix) | trTypeVer (vertical transform matrix) |
|---|---|---|
| −1 (mts_flag = 0) | 0 (DCT-II) | 0 (DCT-II) |
| 0 | 1 (DST-VII) | 1 (DST-VII) |
| 1 | 2 (DST-VIII) | 1 (DST-VII) |
| 2 | 1 (DST-VII) | 2 (DST-VIII) |
| 3 | 2 (DST-VIII) | 2 (DST-VIII) |

2.4 New Progress for MTS (According to VVC Working Draft 4)

2.4.1 JVET-L0134

As distribution of the intra prediction error signal appears to correlate with the shape of the block, it is proposed to select different transforms for different directions based on the width and height of the transform block. More precisely, it is proposed to use DST7 for the shorter side of the transform block and DCT2 for the longer side of the block. For square blocks it is proposed to use DCT2 for both horizontal and vertical transforms.

TABLE 3

Proposed transform derivation and signalling table with differences to VTM-2 are demarcated using bolded double parentheses.

| | | | Intra | | Inter | |
|---|---|---|---|---|---|---|
| MTS_CU_flag | MTS_Hor_flag | MTS_Ver_flag | Horizontal | Vertical | Horizontal | Vertical |
| 0 | | | ((DST7 if width < height, else DCT2 | DST7 if height < width, else DCT2)) | DCT2 | |

TABLE 3-continued

Proposed transform derivation and signalling table with differences to VTM-2 are demarcated using bolded double parentheses.

| | | | Intra | | Inter | |
|---|---|---|---|---|---|---|
| MTS_CU_flag | MTS_Hor_flag | MTS_Ver_flag | Horizontal | Vertical | Horizontal | Vertical |
| 1 | 0 | 0 | DST7 | DST7 | DCT8 | DCT8 |
|   | 0 | 1 | DCT8 | DST7 | DST7 | DCT8 |
|   | 1 | 0 | DST7 | DCT8 | DCT8 | DST7 |
|   | 1 | 1 | DCT8 | DCT8 | DST7 | DST7 |

2.4.2 JVET-M0464

Instead of parsing the MTS flag first, then the transform skip (TS) flag followed by fixed length coding with 2 bins for the MTS index, the new joint syntax element tu_mts_idx uses truncated unary binarization. The first bin indicates TS, the second bin indicates MTS flag and all following the MTS index. The complete semantics and binarization is shown in the following table:

| | transform type | | binarization | | |
|---|---|---|---|---|---|
| tu_mts_idx | horizontal | vertical | MTS & TS enabled | MTS enabled | TS enabled |
| 0 | SKIP | SKIP | 0 | — | 0 |
| 1 | DCT-II | DCT-II | 10 | 0 | 1 |
| 2 | DST-VII | DST-VII | 110 | 10 | — |
| 3 | DCT-VIII | DST-VII | 1110 | 110 | — |
| 4 | DST-VII | DCT-VIII | 11110 | 1110 | — |
| 5 | DCT-VIII | DCT-VIII | 11111 | 1111 | — |

The number of context models is not changed and the assignment of the context index increment ctxInc to each bin of tu_mts_idx is as follows:

| | binIdx | | | | | |
|---|---|---|---|---|---|---|
| Syntax element | 0 | 1 | 2 | 3 | 4 | >=5 |
| tu_mts_idx (MTS & TS) | 0 | 1 . . . 6 (1 + cqtDepth) | 7 | 8 | 9 | na |
| tu_mts_idx (MTS) | 1 . . . 6 (1 + cqtDepth) | 7 | 8 | 9 | na | na |
| tu_mts_idx (TS) | 0 | na | na | na | na | na |

2.4.3 Implicit MTS in JVET-M0303

As distribution of the intra prediction error signal appears to correlate with the shape of the block, it is proposed to select different transforms for different directions based on the width and height of the transform block. More precisely, it is proposed to use DST7 for the shorter side of the transform block and DCT2 for the longer side of the block. For square blocks it is proposed to use DCT2 for both horizontal and vertical transforms when MTS is enabled for the sequence and DST7 if MTS is disabled for the sequence. The shape adaptivity is used only for intra blocks that are predicted with spatial prediction modes.

2.4.4 Syntax, Semantics and Decoding Process in Latest VVC Working Draft

2.4.4.1 Syntax Design 7.3.2.1 Sequence Parameter Set RBSP Syntax

| | Descriptor |
|---|---|
| seq_parameter_set_rbsp( ) { | |
| ... | |
|   if( sps_cclm_enabled_flag &&  | |
|     chroma_format_idc = = 1 ) | |
|     sps_cclm_colocated_chroma_flag | u(1) |
|   (( sps_mts_enabled_flag | u(1) |
|   if( sps_mts_enabled_flag ) { | |
|     sps_explicit_mts_intra_enabled_flag | u(1) |
|     sps_explicit_mts_inter_enabled_flag | u(1) )) |
|   } | |
|   sps_sbt_enabled_flag | u(1) |
|   if( sps_sbt_enabled_flag ) | |
|     sps_sbt_max_size_64_flag | u(1) |
| ... | |
| } | |

7.3.6.10 Transform Unit Syntax

| | Descriptor |
|---|---|
| transform_unit( x0, y0, tbWidth, tbHeight, treeType, subTuIndex ) { | |
|   if( treeType = = SINGLE_TREE \|\| treeType = = DUAL_TREE_LUMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) \|\| | |
|         ( subTuIndex = = 1 && !cu_sbt_pos_flag ) ) ) ) \|\| | |
|       ( IntraSubPartitionsSplitType != ISP_NO_SPLIT && | |
|         ( subTuIndex < NumIntraSubPartitions − 1 \|\| !InferTuCbfLuma ) ) ) | |
|       tu_cbf_luma[ x0 ][ y0 ] | ae(v) |
|     if (IntraSubPartitionsSplitType != ISP_NO_SPLIT ) | |
|       InferTuCbfLuma = InferTuCbfLuma && !tu_cbf_luma[ x0 ][ y0 ] | |
|   } | |
|   if( ( treeType = = SINGLE_TREE \|\| treeType = = DUAL_TREE_CHROMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) \|\| | |
|         ( subTuIndex = = 1 && !cu_sbt_pos_flag ) ) ) ) \|\| | |
|       ( IntraSubPartitionsSplitType != ISP_NO_SPLIT && | |
|         ( subTuIndex = = NumIntraSubPartitions − 1 ) ) ) { | |

|  | Descriptor |
|---|---|
|       tu_cbf_cb[ x0 ][ y0 ] | ae(v) |
|       tu_cbf_cr[ x0 ][ y0 ] | ae(v) |
|     } | |
|   } | |
|   if( IntraSubPartitionsSplitType != ISP_NO_SPLIT && | |
|     treeType = = SINGLE_TREE && subTuIndex = = NumIntraSubPartitions − 1 ) ) | |
|     xC = CbPosX[ x0 ][ y0 ] | |
|     yC = CbPosY[ x0 ][ y0 ] | |
|     wC = CbWidth[ x0 ][ y0 ] / 2 | |
|     hC = CbHeight[ x0 ][ y0 ] / 2 | |
|   } else | |
|     xC = x0 | |
|     yC = y0 | |
|     wC = tbWidth / SubWidthC | |
|     hC = tbHeight / SubHeightC | |
|   } | |
|   if( ( tu_cbf_luma[ x0 ][ y0 ] \|\| tu_cbf_cb[ x0 ][ y0 ] \|\| tu_cbf_cr[ x0 ][ y0 ] ) && | |
|     treeType != DUAL_TREE_CHROMA ) { | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
|   } | |
| (( if( tu_cbf_luma[ x0 ][ y0 ] && treeType != DUAL_TREE_CHROMA | |
|     && ( tbWidth <= 32 ) && ( tbHeight <= 32 ) | |
|     && ( IntraSubPartitionsSplit[ x0 ][ y0 ] == ISP_NO_SPLIT ) && ( !cu_sbt_flag ) ) { | |
|     if( transform_skip_enabled_flag && tbWidth <= MaxTsSize && tbHeight <= MaxTsSize ) | |
|       transform_skip_flag[ x0 ][ y0 ] | ae(v) |
|     if( ((  CuPredMode[ x0 ][ y0 ] != MODE_INTRA && sps_explicit_mts_inter_enabled_flag ) | |
|       \|\| ( CuPredMode[ x0 ][ y0 ] = = MODE_INTRA && sps_explicit_mts_intra_enabled_flag )) | |
|       && ( tbWidth <= 32 ) && ( tbHeight <= 32 ) && ( !transform_skip_flag[ x0 ][ y0 ] ) ) | |
|       tu_mts_idx[ x0 ][ y0 ] | ae(v) |
|   } )) | |
|   if( tu_cbf_luma[ x0 ][ y0 ] ) | |
|     residual_coding( x0, y0, Log2( tbWidth ), Log2( tbHeight ), 0 ) | |
|   if( tu_cbf_cb[ x0 ][ y0 ] ) | |
|     residual_coding( xC, yC, Log2( wC ), Log2( hC ), 1 ) | |
|   if( tu_cbf_cr[ x0 ][ y0 ] ) | |
|     residual_coding( xC, yC, Log2( wC ), Log2( hC ), 2 ) | |
| } | |

2.4.4.2 Semantics sps_mts_enabled_flag equal to 1 specifies that sps_explicit_mts_intra_enabled_flag is present in the sequence parameter set RBSP syntax and that sps_explicit_mts_inter_enabled_flag is present in the sequence parameter set RBSP syntax. sps_mts_enabled_flag equal to 0 specifies that sps_explicit_mts_intra_enabled_flag is not present in the sequence parameter set RBSP syntax and that sps_explicit_mts_inter_enabled_flag is not present in the sequence parameter set RBSP syntax.

sps_explicit_mts_intra_enabled_flag equal to 1 specifies that tu_mts_idx may be present in the transform unit syntax for intra coding units. sps_explicit_mts_intra_enabled_flag equal to 0 specifies that tu_mts_idx is not present in the transform unit syntax for intra coding units. When not present, the value of sps_explicit_mts_intra_enabled_flag is inferred to be equal to 0.

sps_explicit_mts_inter_enabled_flag equal to 1 specifies that tu_mts_idx may be present in the transform unit syntax for inter coding units. sps_explicit_mts_inter_enabled_flag equal to 0 specifies that tu_mts_idx is not present in the transform unit syntax for inter coding units. When not present, the value of sps_explicit_mts_inter_enabled_flag is inferred to be equal to 0.

2.4.4.3 Decoding Process

Whether to enable the implicit MTS is determined according to the following rules:

The variable implicitMtsEnabled is derived as follows:
  If sps_mts_enabled_flag is equal to 1 and one of the following conditions is true, implicitMtsEnabled is set equal to 1:
    IntraSubPartitionsSplitType is not equal to ISP_NO_SPLIT
    cu_sbt_flag is equal to 1 and Max(nTbW,nTbH) is less than or equal to 32
    sps_explicit_mts_intra_enabled_flag and sps_explicit_mts_inter_enabled_flag are both equal to 0 and CuPredMode[xTbY][yTbY] is equal to MODE_INTRA
  Otherwise, implicitMtsEnabled is set equal to 0.

The variable trTypeHor specifying the horizontal transform kernel and the variable trTypeVer specifying the vertical transform kernel are derived as follows:
  If cIdx is greater than 0, trTypeHor and trTypeVer are set equal to 0.
  Otherwise, if implicitMtsEnabled is equal to 1, the following applies:
    If IntraSubPartitionsSplitType is not equal to ISP_NO_SPLIT, trTypeHor and trTypeVer are specified in Table 8-15 depending on intraPredMode.
    Otherwise, if cu_sbt_flag is equal to 1, trTypeHor and trTypeVer are specified in Table 8-14 depending on cu_sbt_horizontal_flag and cu_sbt_pos_flag.

Otherwise (sps_explicit_mts_intra_enabled_flag and sps_explicit_mts_inter_enabled_flag are equal to 0), trTypeHor and trTypeVer are derived as follows:

trTypeHor=(nTbW>=4&&nTbW<=16&&nTbW<= nTbH)?1:0 (8-1030)

trTypeVer=(nTbH>=4&&nTbH<=16&&nTbH<= nTbW)?1:0 (8-1031)

Otherwise, trTypeHor and trTypeVer are specified in Table 8-13 depending on tu_mts_idx[xTbY][yTbY].

TABLE 8-13

Specification of trTypeHor and trTypeVer depending on tu_mts_idx[ x ][ y ]

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

2.4.5 Reduced Secondary Transform

In JEM, secondary transform is applied between forward primary transform and quantization (at encoder) and between de-quantization and inverse primary transform (at decoder side). As shown in FIG. 1, 4×4 (or 8×8) secondary transform is performed depends on block size. For example, 4×4 secondary transform is applied for small blocks (i.e., min (width, height)<8) and 8×8 secondary transform is applied for larger blocks (i.e., min (width, height)>4) per 8×8 block.

For the secondary transforms, non-separable transforms are applied, therefore, it is also named as Non-Separable Secondary Transform (NSST). There are totally 35 transform sets and 3 non-separable transform matrices (kernels, each one with 16×16 matrix) per transform set are used.

The Reduced Secondary Transform (RST) was introduced in JVET-K0099 and 4 transform sets (instead of 35 transform sets) mapping introduced in JVET-L0133 according to intra prediction direction. In this contribution, 16×48 and 16×16 matrices are employed for 8×8 and 4×4 blocks, respectively. For notational convenience, 16×48 transform is denoted as RST8×8 and the 16×16 one as RST4×4. Such a method was recently adopted by VVC.

Secondary forward and inverse transforms are a separate process step from that of primary transforms.

For encoder, the primary forward transform is performed first, then followed by secondary forward transform and quantization, and CABAC bit encoding. For decoder, CABAC bit decoding and inverse quantization, then Secondary inverse transform is performed first, then followed by primary inverse transform.

RST applies only to intra coded TUs.

2.5 MTS in VVC Working Draft 5

In the latest VVC working draft, the semantics and syntax tables are misaligned.

7.3.2.3 Sequence Parameter Set RBSP Syntax

| | Descriptor |
|---|---|
| seq_parameter_set_rbsp( ) { | |
|   sps_decoding_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gra_enabled_flag | u(1) |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   bit_depth_luma_minus8 | ue(v) |
|   bit_depth_chroma_minus8 | ue(v) |
|   log2_max_pic_order_cnt_lsb_minus4 | ue(v) |
|   sps_sub_layer_ordering_info_present_flag | u(1) |
|   for( i = ( sps_sub_layer_ordering_info_present_flag ? 0 : sps_max_sub_layers_minus1 ); i <= sps_max_sub_layers_minus1; i++ ) { | |
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } | |
|   long_term_ref_pics_flag | u(1) |
|   sps_idr_rpl_present_flag | u(1) |
|   rpl1_same_as_rpl0_flag | u(1) |
|   for( i = 0; i < !rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++) | |
|       ref_pic_list_struct( i, j ) | |
|   } | |
|   qtbtt_dual_tree_intra_flag | u(1) |
|   log2_ctu_size_minus2 | ue(v) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |

-continued

| | Descriptor |
|---|---|
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| if( sps_max_mtt_hierarchy_depth_inter_slices != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if ( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| sps_sao_enabled_flag | u(1) |
| sps_alf_enabled_flag | u(1) |
| sps_pcm_enabled_flag | u(1) |
| if( sps_pcm_enabled_flag ) { | |
|   pcm_sample_bit_depth_luma_minus1 | u(4) |
|   pcm_sample_bit_depth_chroma_minus1 | u(4) |
|   log2_min_pcm_luma_coding_block_size_minus3 | ue(v) |
|   log2_diff_max_min_pcm_luma_coding_block_size | ue(v) |
|   pcm_loop_filter_disabled_flag | u(1) |
| } | |
| if( ( CtbSizeY / MinCbSizeY +1 ) <= ( pic_width_in_luma_samples / MinCbSizeY − 1 ) ) { | |
|   sps_ref_wraparound_enabled_flag | u(1) |
|   if( sps_ref_wraparound_enabled_flag ) | |
|     sps_ref_wraparound_offset_minus1 | ue(v) |
| } | |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| sps_affine_amvr_enabled_flag | u(1) |
| sps_dmvr_enabled_flag | u(1) |
| sps_cclm_enabled_flag | u(1) |
| if( sps_cclm_enabled_flag && chroma_format_idc = = 1 ) | |
|   sps_cclm_colocated_chroma_flag | u(1) |
| (( sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } )) | |
| sps_sbt_enabled_flag | u(1) |
| ... | |
|   rbsp_trailing_bits( ) | |
| } | |

7.3.7.10 Transform Unit Syntax

| | Descriptor |
|---|---|
| transform_unit( x0, y0, tbWidth, tbHeight, treeType, subTuIndex ) { | |
|   if( treeType = = SINGLE_TREE | | treeType = = DUAL_TREE_LUMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) | | | |
|         ( subTuIndex = = 1 && !cu_sbt_pos_flag ) ) ) ) | | | |
|     ( IntraSubPartitionsSplitType != ISP_NO_SPLIT && | |
|     ( subTuIndex < NumIntraSubPartitions − 1 | | !InferTuCbfLuma ) ) ) | |
|     tu_cbf_luma[ x0 ][ y0 ] | ae(v) |
|     if (IntraSubPartitionsSplitType != ISP_NO_SPLIT ) | |
|       InferTuCbfLuma = InferTuCbfLuma && !tu_cbf_luma[ x0 ][ y0 ] | |
|   } | |
|   if( ( treeType = = SINGLE_TREE | | treeType = = DUAL_TREE_CHROMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) | | | |
|         ( subTuIndex = = 1 && !cu_sbt_pos_flag ) ) ) ) | | | |

|  | Descriptor |
|---|---|
|       ( IntraSubPartitionsSplitType != ISP_NO_SPLIT &&<br>        ( subTuIndex = = NumIntraSubPartitions − 1 ) ) ) {<br>        tu_cbf_cb[ x0 ][ y0 ]<br>        tu_cbf_cr[ x0 ][ y0 ]<br>      }<br>    }<br>    if( IntraSubPartitionsSplitType != ISP_NO_SPLIT &&<br>      treeType = = SINGLE_TREE && subTuIndex = = NumIntraSubPartitions − 1 ) )<br>      xC = CbPosX[ x0 ][ y0 ]<br>      yC = CbPosY[ x0 ][ y0 ]<br>      wC = CbWidth[ x0 ][ y0 ] / 2<br>      hC = CbHeight[ x0 ][ y0 ] / 2<br>    } else<br>      xC = x0<br>      yC = y0<br>      wC = tbWidth / SubWidthC<br>      hC = tbHeight / SubHeightC<br>    }<br>    if( ( tu_cbf_luma[ x0 ][ y0 ] | | tu_cbf_cb[ x0 ][ y0 ] | | tu_cbf_cr[ x0 ][ y0 ] ) &&<br>      treeType != DUAL_TREE_CHROMA ) {<br>      if( cu_qp_delta_enabled_flag && !IsCuQpDeltaCoded ) {<br>        cu_qp_delta_abs<br>        if( cu_qp_delta_abs )<br>          cu_qp_delta_sign_flag<br>      }<br>    }<br>    (( if( tu_cbf_luma[ x0 ][ y0 ] && treeType != DUAL_TREE_CHROMA<br>      && ( tbWidth <= 32 ) && ( tbHeight <= 32 )<br>      && ( IntraSubPartitionsSplit[ x0 ][ y0 ] = = ISP_NO_SPLIT ) && ( !cu_sbt_flag ) ) {<br>      if( transform_skip_enabled_flag && tbWidth <= MaxTsSize && tbHeight <= MaxTsSize )<br>        transform_skip_flag[ x0 ][ y0 ]<br>      if( ((  CuPredMode[ x0 ][ y0 ] != MODE_INTRA && sps_explicit_mts_inter_enabled_flag )<br>        | | ( CuPredMode[ x0 ][ y0 ] = = MODE_INTRA && sps_explicit_mts_intra_enabled_flag ))<br>        && ( tbWidth <= 32 ) && ( tbHeight <= 32 ) && ( !transform_skip_flag[ x0 ][ y0 ] ) )<br>        tu_mts_idx[ x0 ][ y0 ]<br>    } ))<br>    if( tu_cbf_luma[ x0 ][ y0 ] )<br>      residual_coding( x0, y0, Log2( tbWidth ), Log2( tbHeight ), 0 )<br>    if( tu_cbf_cb[ x0 ][ y0 ] )<br>      residual_coding( xC, yC, Log2( wC ), Log2( hC ), 1 )<br>    if( tu_cbf_cr[ x0 ][ y0 ] )<br>      residual_coding( xC, yC, Log2( wC ), Log2( hC ), 2 )<br>} | <br><br>ae(v)<br>ae(v)<br><br><br><br><br><br><br><br><br><br><br><br><br><br><br><br><br><br><br><br><br>ae(v)<br><br>ae(v)<br><br><br><br><br><br>ae(v)<br><br><br><br>ae(v) | sps_explicit_mts_intra_enabled_flag equal to 1 specifies that tu_mts_idx may be present in the transform unit syntax for intra coding units. sps_explicit_mts_intra_enabled_flag equal to 0 specifies that tu_mts_idx is not present in the transform unit syntax for intra coding units. When not present, the value of sps_explicit_mts_intra_enabled_flag is inferred to be equal to 0.

sps_explicit_mts_inter_enabled_flag equal to 1 specifies that tu_mts_idx may be present in the transform unit syntax for inter coding units. sps_explicit_mts_inter_enabled_flag equal to 0 specifies that tu_mts_idx is not present in the transform unit syntax for inter coding units. When not present, the value of sps_explicit_mts_inter_enabled_flag is inferred to be equal to 0.

pred_mode_flag equal to 0 specifies that the current coding unit is coded in inter prediction mode. pred_mode_flag equal to 1 specifies that the current coding unit is coded in intra prediction mode. The variable CuPredMode[x][y] is derived as follows for x=x0 . . . x0+cbWidth−1 and y=y0 . . . y0+cbHeight−1:

If pred_mode_flag is equal to 0, CuPredMode[x][y] is set equal to MODE_INTER.

Otherwise (pred_mode_flag is equal to 1), CuPredMode [x][y] is set equal to MODE_INTRA. When pred_mode_flag is not present, it is inferred to be equal to 1 when decoding an I slice, and equal to 0 when decoding a P or B slice, respectively.

pred_mode_ibc_flag equal to 1 specifies that the current coding unit is coded in IBC prediction mode. pred_mode_ibc_flag equal to 0 specifies that the current coding unit is not coded in IBC prediction mode. When pred_mode_ibc_flag is not present, it is inferred to be equal to the value of sps_ibc_enabled_flag when decoding an I slice, and 0 when decoding a P or B slice, respectively.

When pred_mode_ibc_flag is equal to 1, the variable CuPredMode[x][y] is set to be equal to MODE_IBC for x=x0 . . . x0+cbWidth−1 and y=y0 . . . y0+cbHeight−1.

2.6 Sub-Block Transform

For an inter-predicted CU with cu_cbf equal to 1, cu_sbt_flag may be signaled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode.

Figure 3:
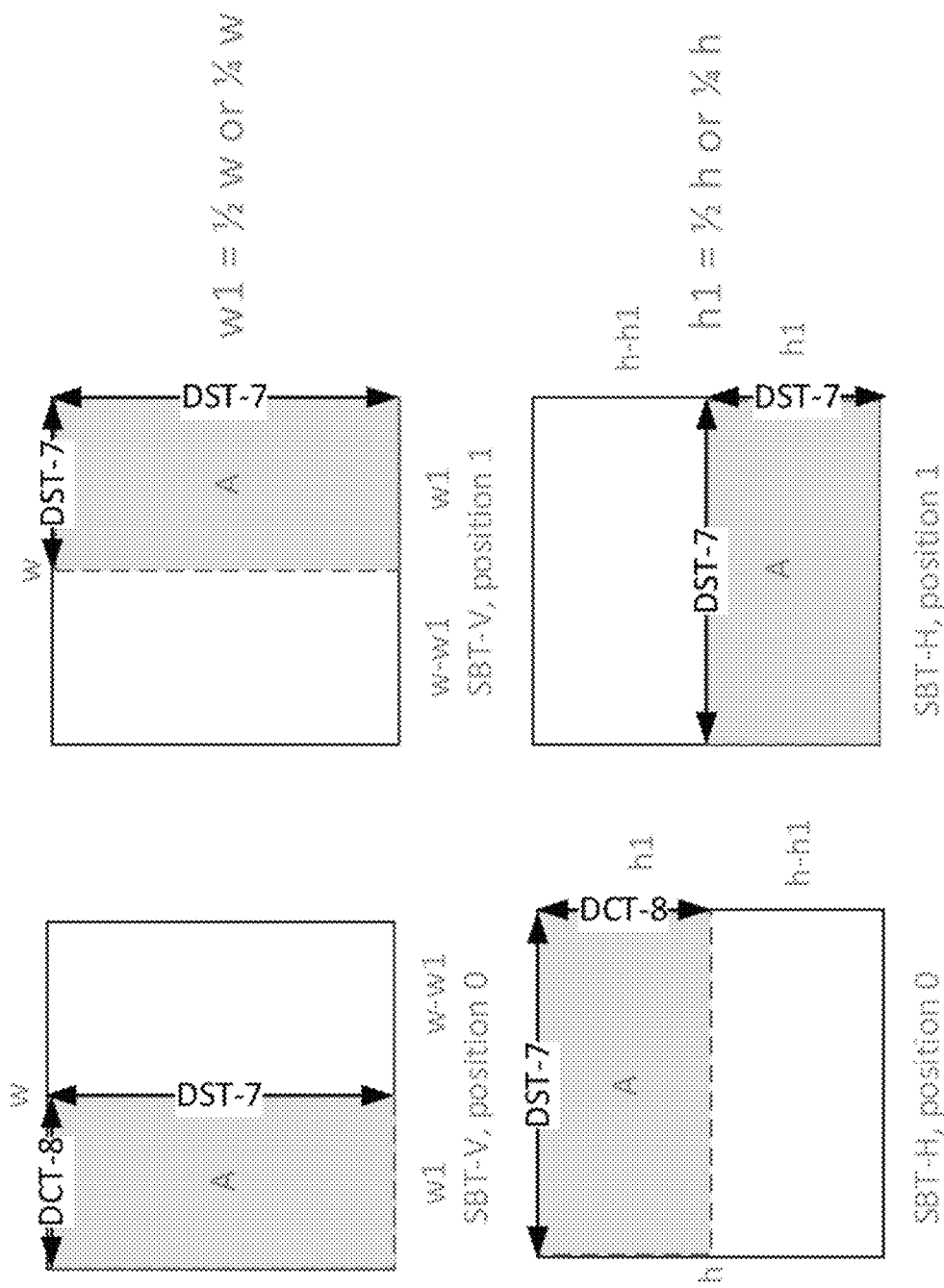
FIG. 3 shows an example of sub-block transform modes SBT-V and SBT-H.

In sub-block transform, position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 3. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

2.7 Affine Linear Weighted Intra Prediction (ALWIP or Matrix Based Intra Prediction)

Affine linear weighted intra prediction (ALWIP, a.k.a. Matrix based intra prediction (MIP)) is proposed in JVET-N0217.

In JVET-N0217, two tests are conducted. In test 1, ALWIP is designed with a memory restriction of 8K bytes and at most 4 multiplications per sample. Test 2 is similar to test 1, but further simplifies the design in terms of memory requirement and model architecture.

Single set of matrices and offset vectors for all block shapes.
Reduction of number of modes to 19 for all block shapes.
Reduction of memory requirement to 5760 10-bit values, that is 7.20 Kilobyte.
Linear interpolation of predicted samples is carried out in a single step per direction replacing iterative interpolation as in the first test.

2.8 Intra Subblock Partitioning (ISP)

Figure 4:
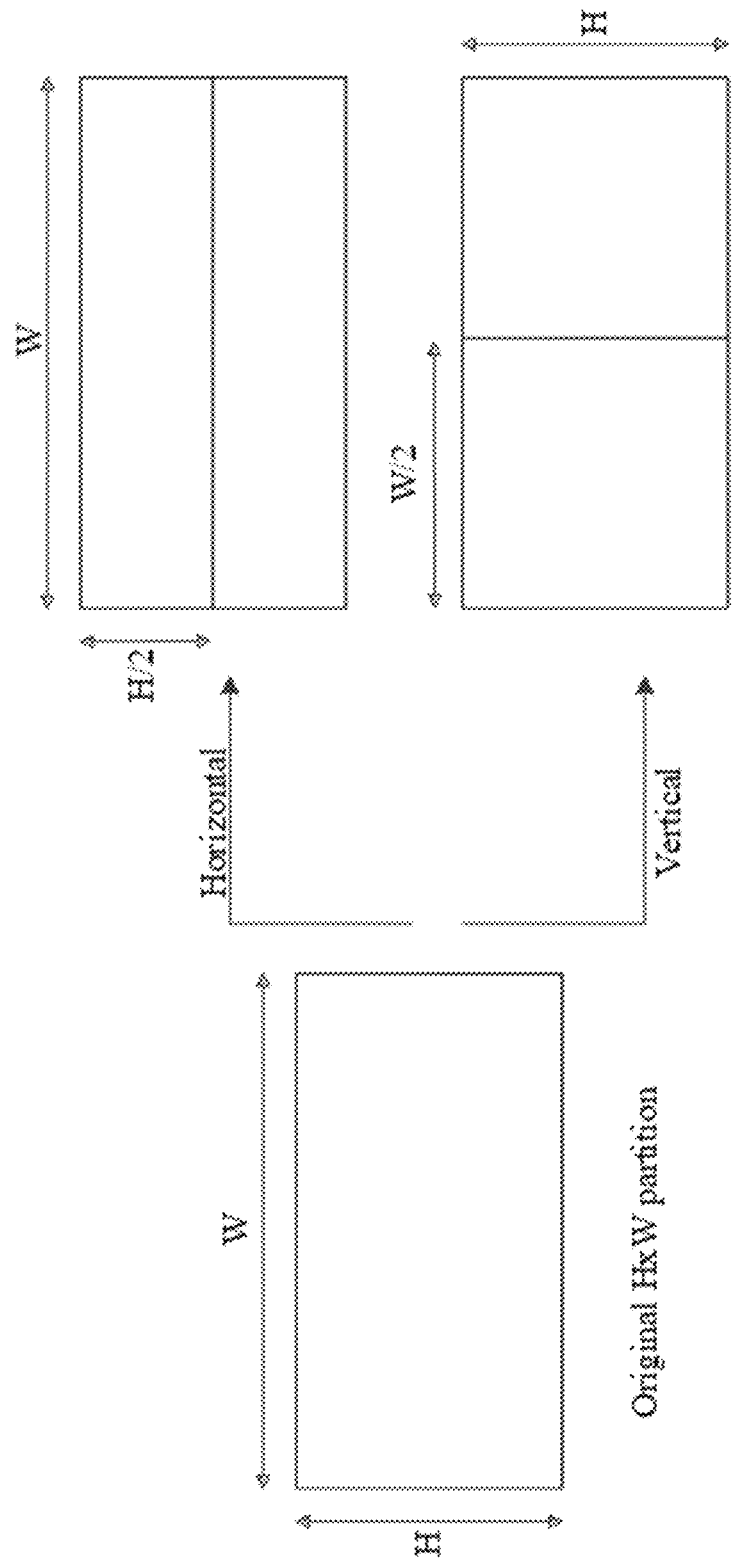
FIG. 4 shows an example of divisions of 4×8 and 8×4 blocks.
Figure 5:
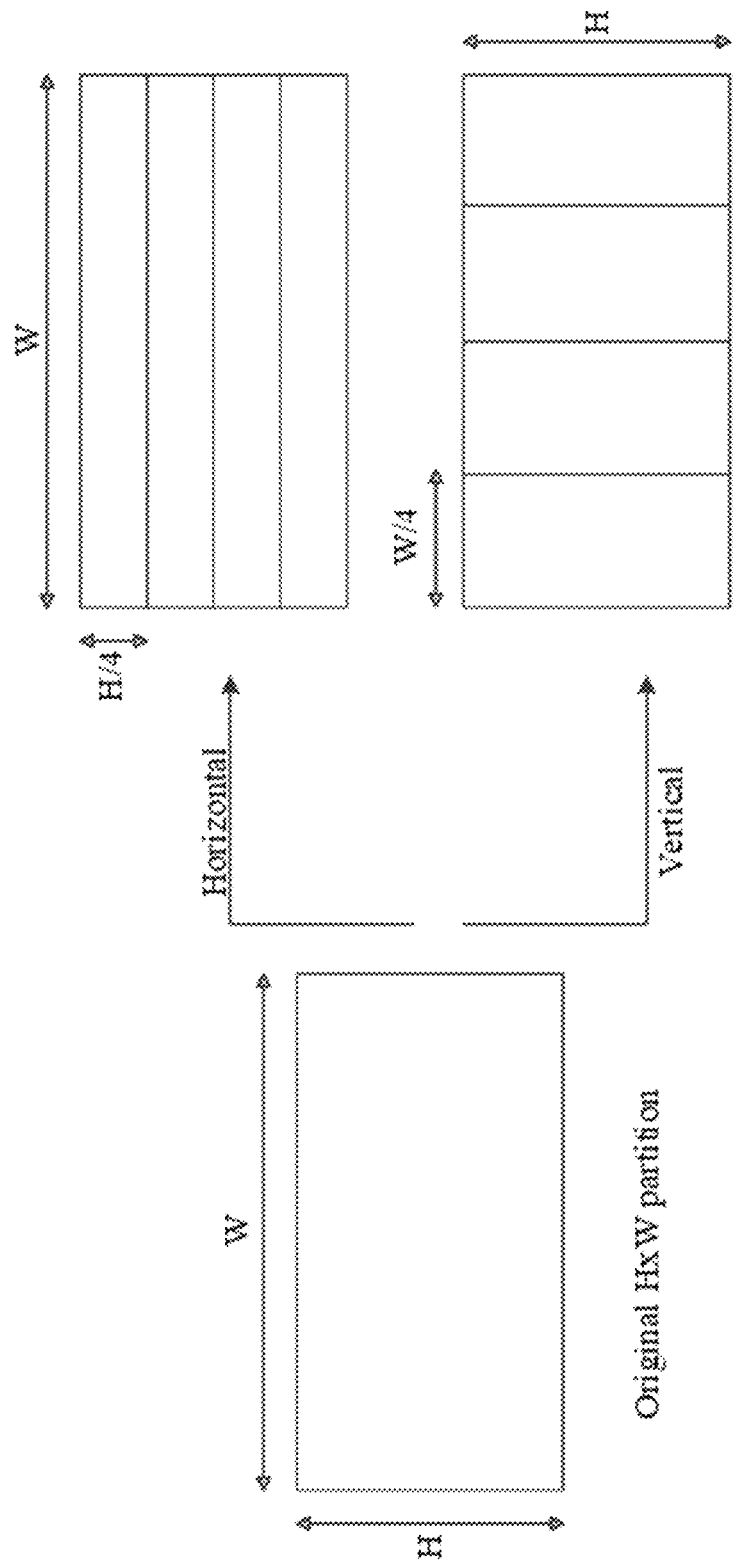
FIG. 5 shows an example of divisions all blocks except 4×8, 8×4 and 4×4.

In JVET-M0102, ISP is proposed, which divides luma intra-predicted blocks vertically or horizontally into 2 or 4 sub-partitions depending on the block size dimensions, as shown in Table 4. FIG. 4 and FIG. 5 show examples of the two possibilities. All sub-partitions fulfill the condition of having at least 16 samples.

TABLE 4

Number of sub-partitions depending on the block size

| Block Size | Number of Sub-Partitions |
|---|---|
| 4 × 4 | Not divided |
| 4 × 8 and 8 × 4 | 2 |
| All other cases | 4 |

For each of these sub-partitions, a residual signal is generated by entropy decoding the coefficients sent by the encoder and then invert quantizing and invert transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

Based on the intra mode and the split utilized, two different classes of processing orders are used, which are referred to as normal and reversed order. In the normal order, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. On the other hand, the reverse processing order either starts with the sub-partition containing the bottom-left sample of the CU and continues upwards or starts with sub-partition containing the top-right sample of the CU and continues leftwards.

2.9 Block Differential Pulse-Code Modulation Coding (BDPCM)

BDPCM is proposed in JVET-M0057. Due to the shape of the horizontal (resp. vertical) predictors, which use the left (A) (resp. top (B)) pixel for prediction of the current pixel, the most throughput-efficient way of processing the block is to process all the pixels of one column (resp. line) in parallel, and to process these columns (resp. lines) sequentially. In order to increase throughput, we introduce the following process: a block of width 4 is divided into two halves with a horizontal frontier when the predictor chosen on this block is vertical, and a block of height 4 is divided into two halves with a vertical frontier when the predictor chosen on this block is horizontal.

When a block is divided, samples from one area are not allowed to use pixels from another area to compute the prediction: if this situation occurs, the prediction pixel is replaced by the reference pixel in the prediction direction. This is shown on FIG. 6 for different positions of current pixel X in a 4×8 block predicted vertically.

Figure 7:
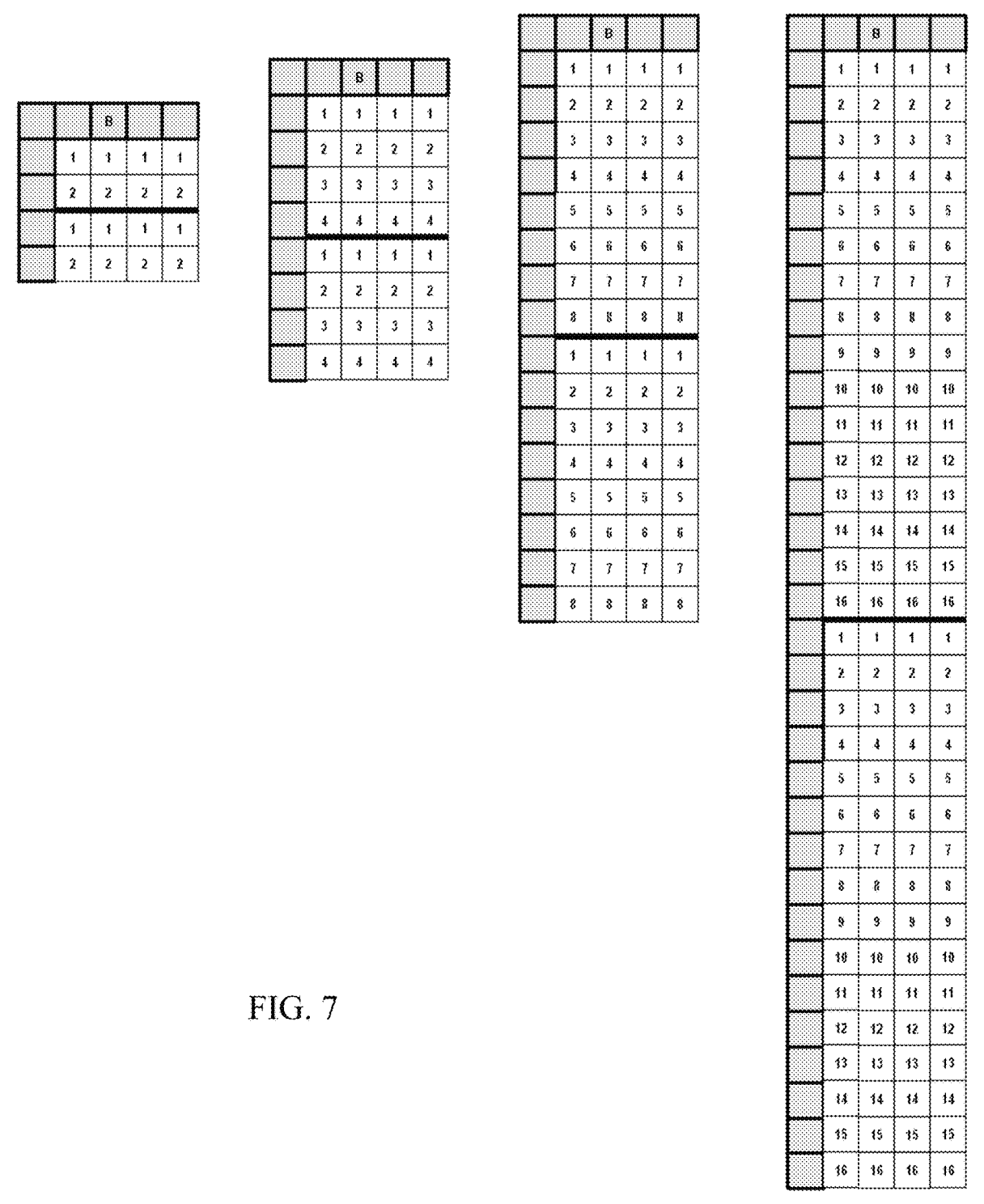

Because of this property, it becomes now possible to process a 4×4 block in 2 cycles, and a 4×8 or 8×4 block in 4 cycles, and so on, as shown on FIG. 7.

2.10 Quantized Residual Domain BDPCM

In JVET-N0413, quantized residual domain BDPCM (denote as RBDPCM hereinafter) is proposed. The intra prediction is done on the entire block by sample copying in prediction direction (horizontal or vertical prediction) similar to intra prediction. The residual is quantized and the delta between the quantized residual and its predictor (horizontal or vertical) quantized value is coded.

For a block of size M (rows)×N (cols), let $r_{i,j}$, $0 \leq i \leq M-1$, $0 \leq j \leq N-1$. be the prediction residual after performing intra prediction horizontally (copying left neighbor pixel value across the the predicted block line by line) or vertically (copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signaled:

$$\tilde{r}_{i,j} = \begin{cases} Q(r_{i,j}), & i = 0, \quad 0 \leq j \leq (N-1) \\ Q(r_{i,j}) - Q(r_{(i-1),j}), & 1 \leq i \leq (M-1), \; 0 \leq j \leq (N-1) \end{cases}$$

For horizontal prediction, similar rules apply, and the residual quantized samples are obtained by $$\tilde{r}_{i,j} = \begin{cases} Q(r_{i,j}), & 0 \leq i \leq (M-1), \quad j = 0 \\ Q(r_{i,j}) - Q(r_{i,(j-1)}), & 0 \leq i \leq (M-1), \; 1 \leq j \leq (N-1) \end{cases}$$

The residual quantized samples $\tilde{r}_{i,j}$ are sent to the decoder.

On the decoder side, the above calculations are reversed to produce $Q(r_{i,j})$, $0 \leq i \leq M-1$, $0 \leq j \leq N-1$. For vertical prediction case, $$Q(r_{i,j}) = \Sigma_{k=0}^{i} \tilde{r}_{k,j}, \; 0 \leq i \leq (M-1), \; 0 \leq j \leq (N-1)$$

For horizontal case, $$Q(r_{i,j}) = \Sigma_{k=0}^{j} \tilde{r}_{i,k}, \; 0 \leq i \leq (M-1), \; 0 \leq j \leq (N-1)$$

The invert quantized residuals, $Q^{-1}(Q(r_{i,j}))$, are added to the intra block prediction values to produce the reconstructed sample values.

One of the benefits of this scheme is that inverting the DPCM can be done on the fly during coefficient parsing simply adding the predictor as the coefficients are parsed or it can be performed after parsing.

Transform skip is always used in quantized residual domain BDPCM.

3 Drawbacks of Existing Implementations

In the current design of VVC, three different merge list are utilized with different procedures which increases the hardware implementation cost.

(1) MTS is only applied to luma block which may be sub-optimal for color rich sequences, such as for 4:4:4 or other color formats are enabled.

(2) MTS is supported for both intra, inter and IBC. And the control of IBC MTS is under the conditional check of whether MTS is enabled for inter coded blocks. Since IBC is defined to be a third mode, which may be better to control the usage of IBC MTS separately.

(3) The context for coding MTS index is dependent on the CU depth. However, there is some correlation between the transform index and coded mode. Using such correlation may bring additional coding gains.

(4) When IBC is treated as inter mode, there is no issue with the condition check for signaling MTS index. However, IBC is now treated as a new mode, in parallel to intra and inter mode, the conditional check and the semantics now has issues.

4 Example Methods for Context Modeling and Multiple Transform Matrix Selection Embodiments of the presently disclosed technology overcome the drawbacks of existing implementations, thereby providing video coding with higher coding efficiencies. The methods for context modeling and multiple transform matrix selection, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

1. Whether and/or how to apply implicit MTS (i.e., transform matrix selection without transform index explicitly signaled) may depend on whether a block is coded with mode X and/or coded residual information.
   a. In one example, mode X may be IBC mode.
   b. In one example, when one block is coded with the IBC mode, implicit MTS may be automatically enabled.
   c. In one example, the selection of transform matrix for IBC coded blocks may be the same as that for intra coded blocks.
      i. In one example, for the square blocks, DCT-2 is applied.
      ii. In one example, for the non-square blocks, DST-7 is applied to the shorter side, and DCT-2 is applied to the longer side.
   d. In one example, the selection of transform matrix may depend on the coded mode information, such as whether a block is coded with intra or IBC.
      i. In one example, for the IBC-coded square blocks, DST-7 is applied.
      ii. In one example, for the IBC-coded non-square blocks, transform skip may be applied to the shorter side
      iii. In one example, for the IBC-coded non-square blocks, transform skip or DST-7 may be applied to the longer side.
   e. In other examples, mode X may be secondary transform.
   f. In other examples, mode X may be BDPCM mode or/and DPCM mode or/and RBDPCM mode or/and ALWIP mode.
   g. In other examples, mode X may be any specific angular intra-prediction modes (such as DC, Planar, Vertical, Horizontal, etc.)

2. The sets of allowed transforms may be determined according to whether a block is coded with mode X.
   a. In one example, mode X may be IBC mode.
   b. In one example, mode X may be combined intra and inter prediction mode (CIIP).
   c. In one example, the set of allowed transform matrix for IBC coded blocks may be the same as that for intra coded blocks.
   d. Alternatively, different sets of allowed transform matrix for IBC coded blocks may be the same as that for intra coded blocks, such as for IBC coded blocks, transform skip, DCT-2, DCT-8, DST-7 may be allowed.
   e. In other examples, mode X may be BDPCM mode or/and DPCM mode or/and RBDPCM mode or/and ALWIP mode.
   f. In other examples, mode X may be any specific angular intra-prediction modes (such as DC, Planar, Vertical, Horizontal, etc.)
   g. In other examples, mode X may be secondary transform.

3. It is proposed that the context modeling for coding the MTS index may depend on the coded mode information.
   a. The coded mode information may include: intra or non-intra.
      i. Alternatively, the coded mode information may include: intra or inter or IBC.
      ii. Alternatively, the coded mode information may include: inter or non-inter.
   b. Alternatively, the context modeling for coding the MTS index may depend on block shape information.
      i. In one example, the block shape information may include: whether the block is square or non-square;
      ii. In one example, the block shape information may include: whether the width is no larger than height or not;
      iii. In one example, the block shape information may include: whether the width is no smaller than height or not;
      iv. In one example, the block shape information may include: the ratio of width and height;

4. It is proposed to code the horizontal and vertical transform matrix indices separately.
   a. In one example, the transform skip flag is not coded separately. Instead, it is treated as one of the horizontal and vertical transform matrix indices.
      i. In one example, transform skip may be only applied in one direction (such as horizontal or vertical).
   b. The context modeling of vertical transform matrix index may depend on the horizontal transform matrix index. Alternatively, the context modeling of horizontal transform matrix index may depend on the vertical transform matrix index.
c. In one example, one flag may be firstly coded to indicate whether the horizontal and vertical transform matrix are the same.

5. Indication of usage of MTS for IBC coded blocks may be signaled in the sequence/picture/tile group/slice/CTU row/any video data unit-level.
   a. In one example, whether to enable MTS for IBC coded blocks (e.g., one flag) may be signaled in SPS/PPS/slice header/picture header/tile group header/tile header, etc. al.
      i. Alternatively, furthermore, such as flag may be conditionally coded, such as based on whether explicit MTS and IBC is enabled in SPS/PPS/Slice header/picture header etc. al.
   b. Alternatively, whether to enable MTS for IBC coded blocks (e.g., one flag) may be derived from whether to enable MTS for inter coded blocks.
      i. In this case, only one SPS flag may be signaled to control both IBC and inter MTS.
   c. In one example, MTS for IBC coded blocks may be always disallowed.
   d. In one example, whether and/or how to apply MTS may depend on the number of non-zero coded coefficients.
   e. In one example, whether and/or how to apply MTS may depend on the sum of absolute value of non-zero coded coefficients.
   f. In one example, whether and/or how to apply MTS may depend on the last position of non-zero coefficient.

6. Whether and/or how to apply MTS for chroma component may depend on the color format.
   a. In one example, when the color subsampling format is 4:4:4, MTS for chroma components (or dependent components such as B/R color components) may be enabled.
   b. In one example, when MTS for chroma component is enabled, two corresponding blocks of the color components may be forced to apply the same transform matrices.
      i. Indications of selected transform matrices may be signaled for one block in one color component, and the other block in another color component follows the same matrices.
      ii. Transform matrices applied to chroma components may be derived from that used for the corresponding luma block or the main component (such as G color component).
   c. In one example, when MTS for chroma component is enabled, two corresponding blocks of the color components may use different transform matrices.
      i. Indications of selected transform matrices for the two blocks may be signaled separately.
         1. Alternatively, furthermore, predictive coding of transform matrix indices among the two-color components may be applied.
         2. Alternatively, furthermore, predictive coding of transform matrix indices among one color component and the luma/main component may be applied.
         3. Alternatively, the transform matrix of one-color component and/or the luma/main component may be utilized for context modeling of coding the index of another color component.
   d. Whether to signal the MTS index for chroma component may depend on the color format and/or separate plane coding is enabled or not.
      i. In one example, if it is 4:0:0 and/or separate plane coding is enabled, there is no need to signal the MTS index for chroma components.

7. The above methods which are applied to implicit MTS may be also applicable to SBT which also derives the transform matrix on-the-fly.

8. Whether and/or how to apply ISP for chroma component may depend on the color format.
   a. In one example, when the color subsampling format is 4:4:4, ISP for chroma components (or dependent components such as B/R color components) may be enabled. Alternatively, furthermore, when the color subsampling format is not 4:4:4, ISP for chroma components (or dependent components such as B/R color components) may be disabled.
   b. When ISP is enabled for chroma components, indications of usage of ISP and/or other related information (such as ISP partitions) for a chroma block may be coded.
      i. In one example, it may be conditionally coded according to the block dimension.
      ii. In one example, it may be conditionally coded according to the intra prediction method, such as whether cross-component linear model prediction method is applied.
      iii. In one example, it may be conditionally coded according to the intra prediction method, such as whether joint chroma residual coding is applied.
      iv. In one example, it may be conditionally coded according to intra prediction direction.
      v. In one example, it may be conditionally coded according to whether DM is used (i.e., intra prediction mode is derived from luma component).
   c. When ISP is enabled for chroma components, indications of usage of ISP and/or other related information (such as ISP partitions) for a chroma block may be derived on-the-fly.
      i. In one example, they may be derived according to neighboring chroma blocks' reconstructed samples/coded information.
      ii. In one example, they may be derived according to one or multiple selective blocks within the collocated luma block.
      iii. In one example, they may be derived according to the neighboring information of the collocated luma block.

The examples described above may be incorporated in the context of the methods described below, e.g., methods 810, 820, 830, 840, 850, 860, 870, 880 and 890, which may be implemented at a video decoder or a video encoder.

Figure 8A:
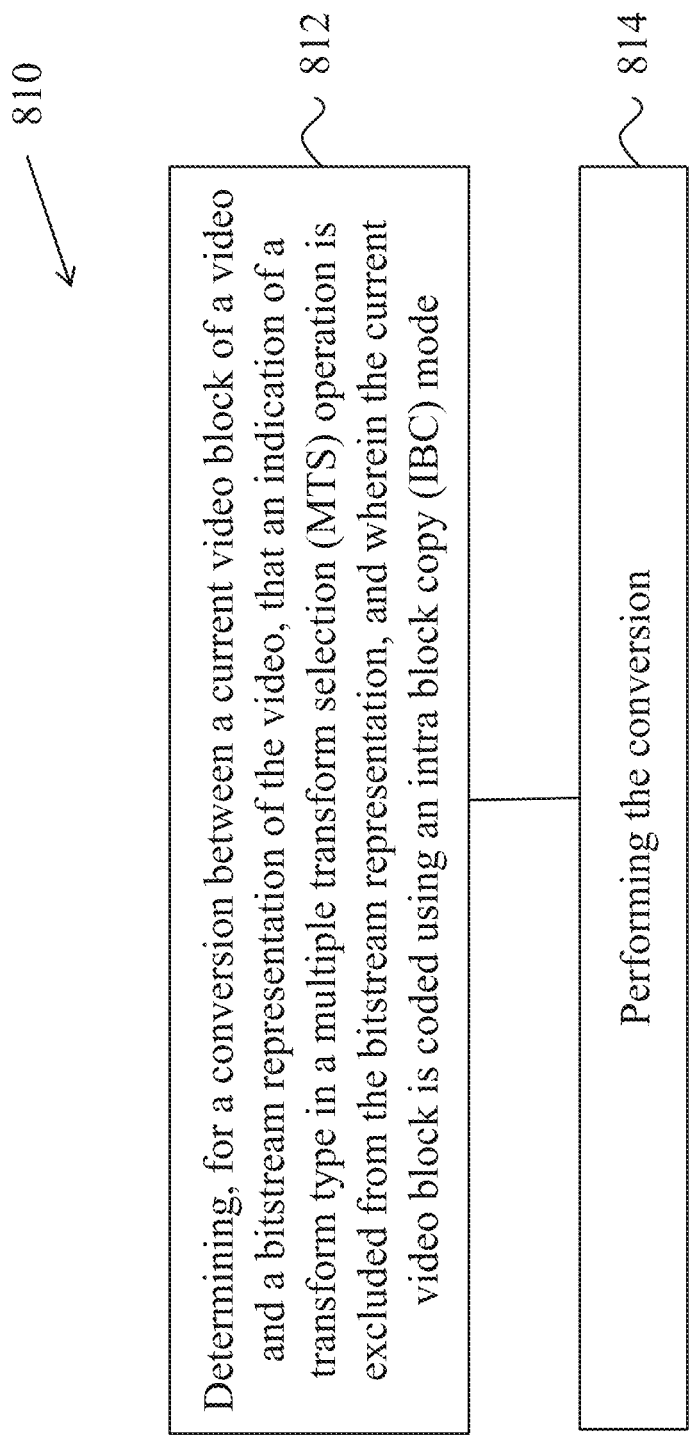

FIG. 8A shows a flowchart of an exemplary method for video processing. The method 810 includes, at step 812, determining, for a conversion between a current video block of a video and a bitstream representation of the video, that an indication of a transform type in a multiple transform selection (MTS) operation is excluded from the bitstream representation, and wherein the current video block is coded using an intra block copy (IBC) mode.

The method 810 includes, at step 814, performing the conversion. In some embodiments, the indication is in a sequence parameter set (SPS), a picture parameter set (PPS), a tile group header, a slice header, a picture header, a tile header, a coding tree unit (CTU) row, a coding unit, or a video data unit, and the MTS operation comprises using a transform from a plurality of predefined transform candidates for transforming a prediction error of the current video block during the conversion.

Figure 8B:
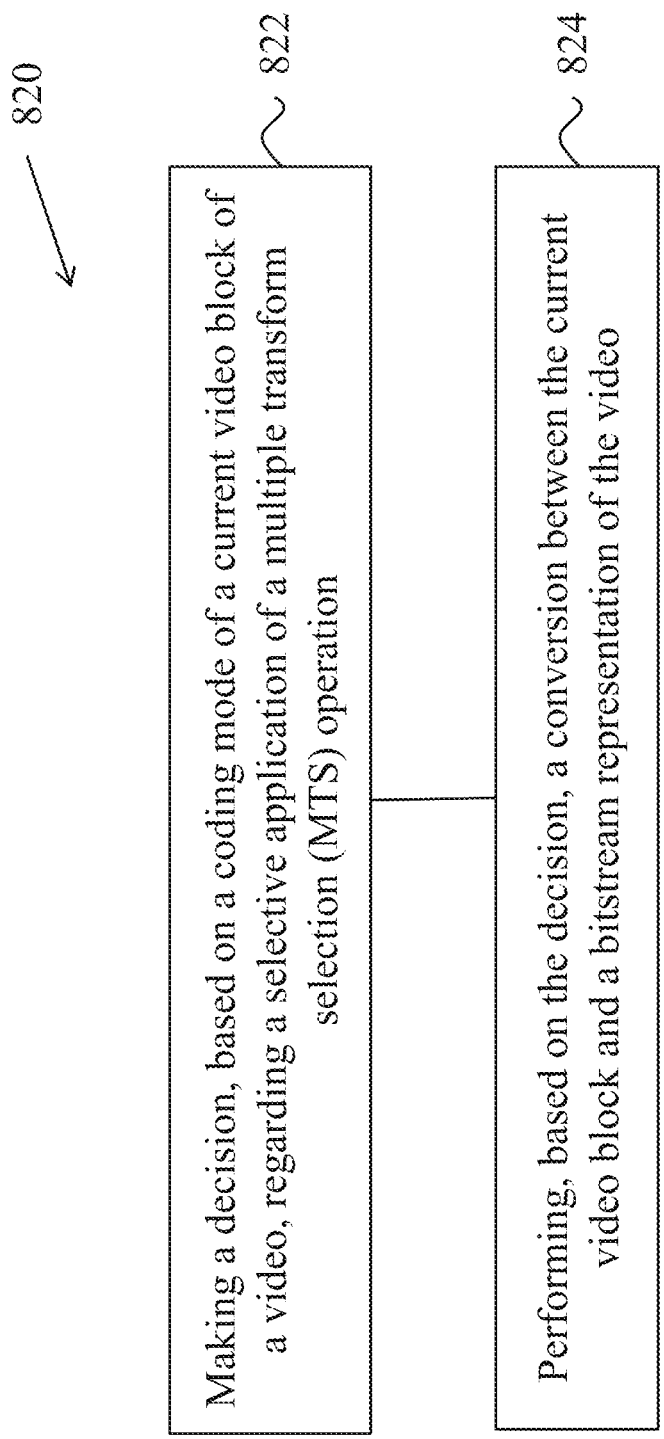

FIG. 8B shows a flowchart of an exemplary method for video processing. The method 820 includes, at step 822, making a decision, based on a coding mode of a current video block of a video, regarding a selective application of a multiple transform selection (MTS) operation.

The method 820 includes, at step 824, performing, based on the decision, a conversion between the current video block and a bitstream representation of the video. In some embodiments, the MTS operation comprises using a transform from a plurality of predefined transform candidates for transforming a prediction error of the current video block during the conversion.

Figure 8C:
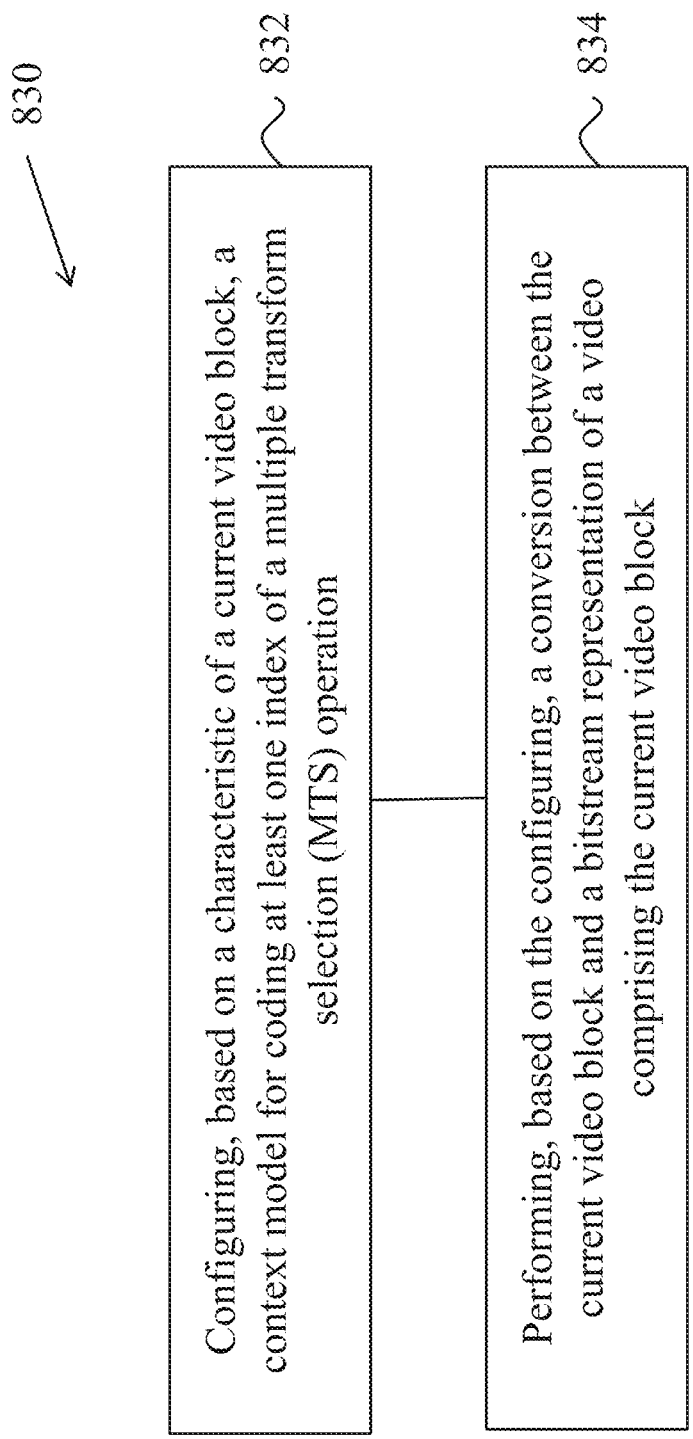

FIG. 8C shows a flowchart of an exemplary method for video processing. The method 830 includes, at step 832, configuring, based on a characteristic of a current video block, a context model for coding at least one index of a multiple transform selection (MTS) operation.

The method 830 includes, at step 834, performing, based on the configuring, a conversion between the current video block and a bitstream representation of a video comprising the current video block. In some embodiments, the MTS operation comprises using a transform from a plurality of predefined transform candidates for transforming a prediction error of the current video block during the conversion.

Figure 8D:
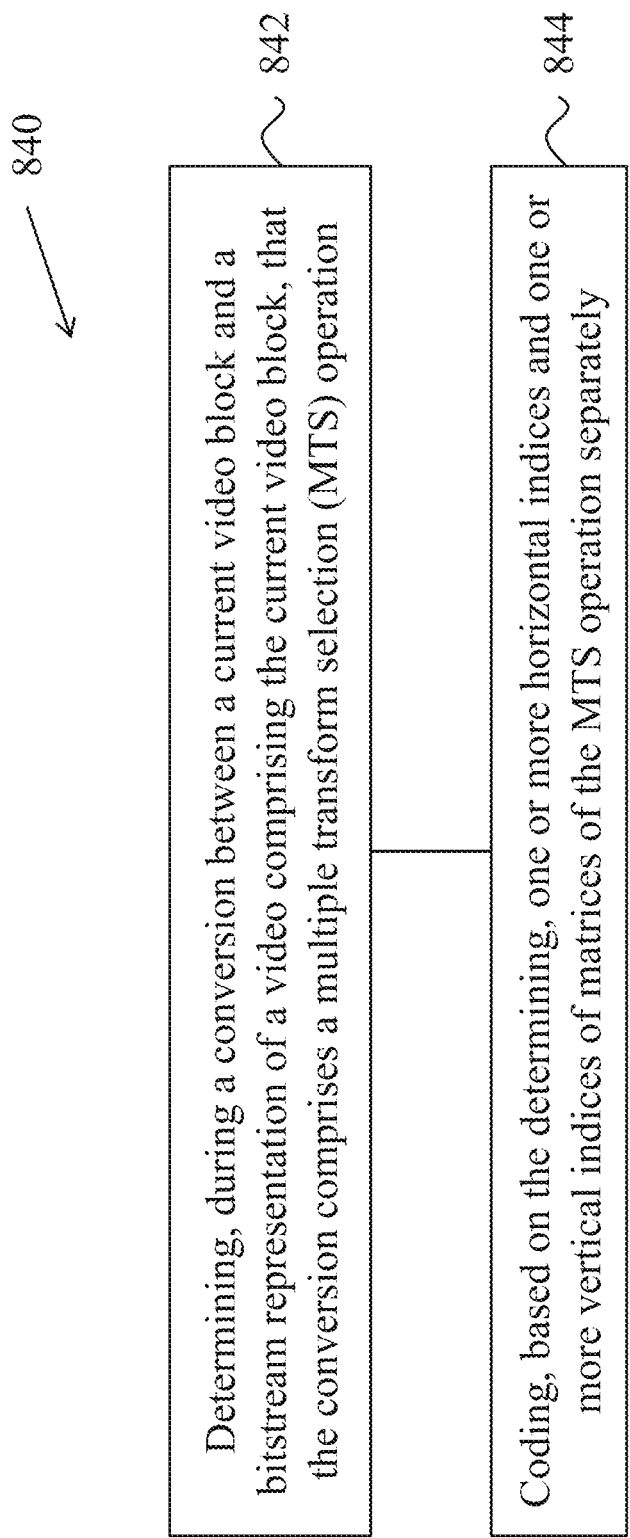

FIG. 8D shows a flowchart of an exemplary method for video processing. The method 840 includes, at step 842, determining, during a conversion between a current video block and a bitstream representation of a video comprising the current video block, that the conversion comprises a multiple transform selection (MTS) operation.

The method 840 includes, at step 844, coding, based on the determining, one or more horizontal indices and one or more vertical indices of matrices of the MTS operation separately. In some embodiments, the MTS operation comprises using a transform from a plurality of predefined transform candidates for transforming a prediction error of the current video block during the conversion.

Figure 8E:
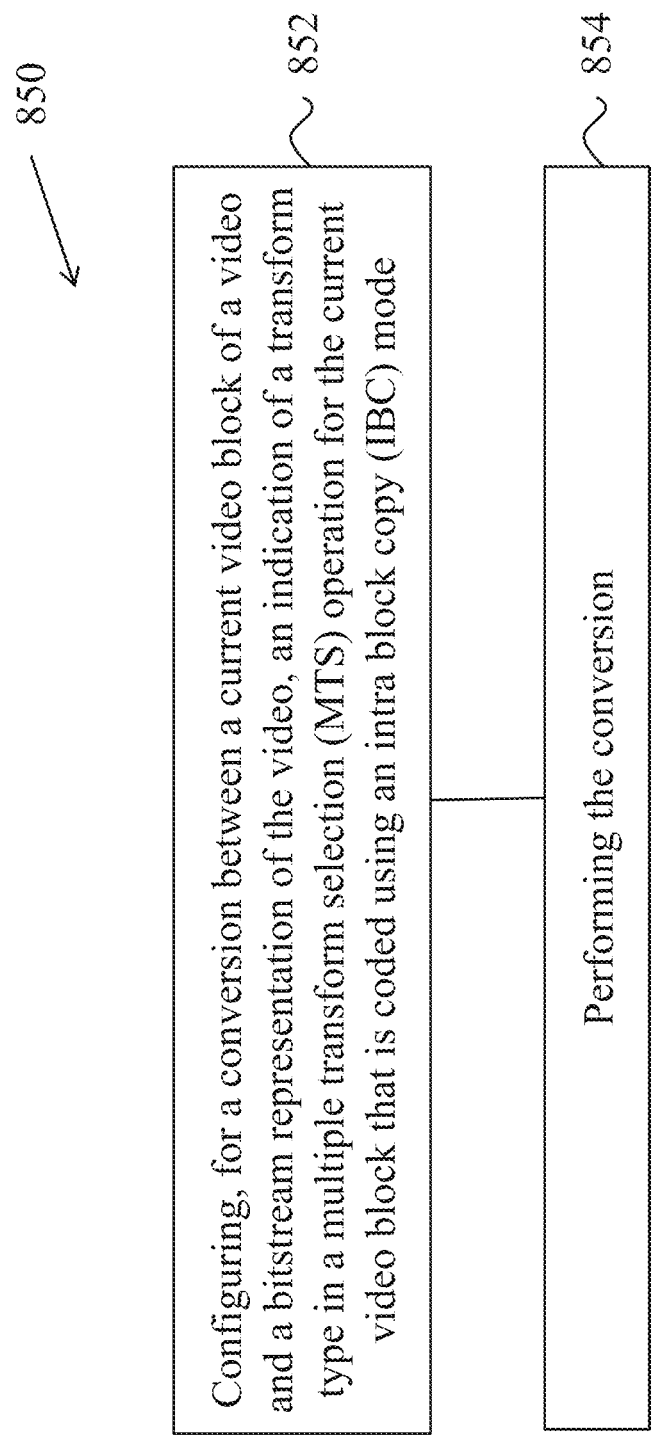

FIG. 8E shows a flowchart of an exemplary method for video processing. The method 850 includes, at step 852, configuring, for a conversion between a current video block of a video and a bitstream representation of the video, an indication of a transform type in a multiple transform selection (MTS) operation for the current video block that is coded using an intra block copy (IBC) mode.

The method 850 includes, at step 854, performing the conversion. In some embodiments, the indication is in a sequence parameter set (SPS), a picture parameter set (PPS), a tile group header, a slice header, a picture header, a tile header, a coding tree unit (CTU) row, or a video data unit, and the MTS operation comprises using a transform from a plurality of predefined transform candidates for transforming a prediction error of the current video block during the conversion.

Figure 8F:
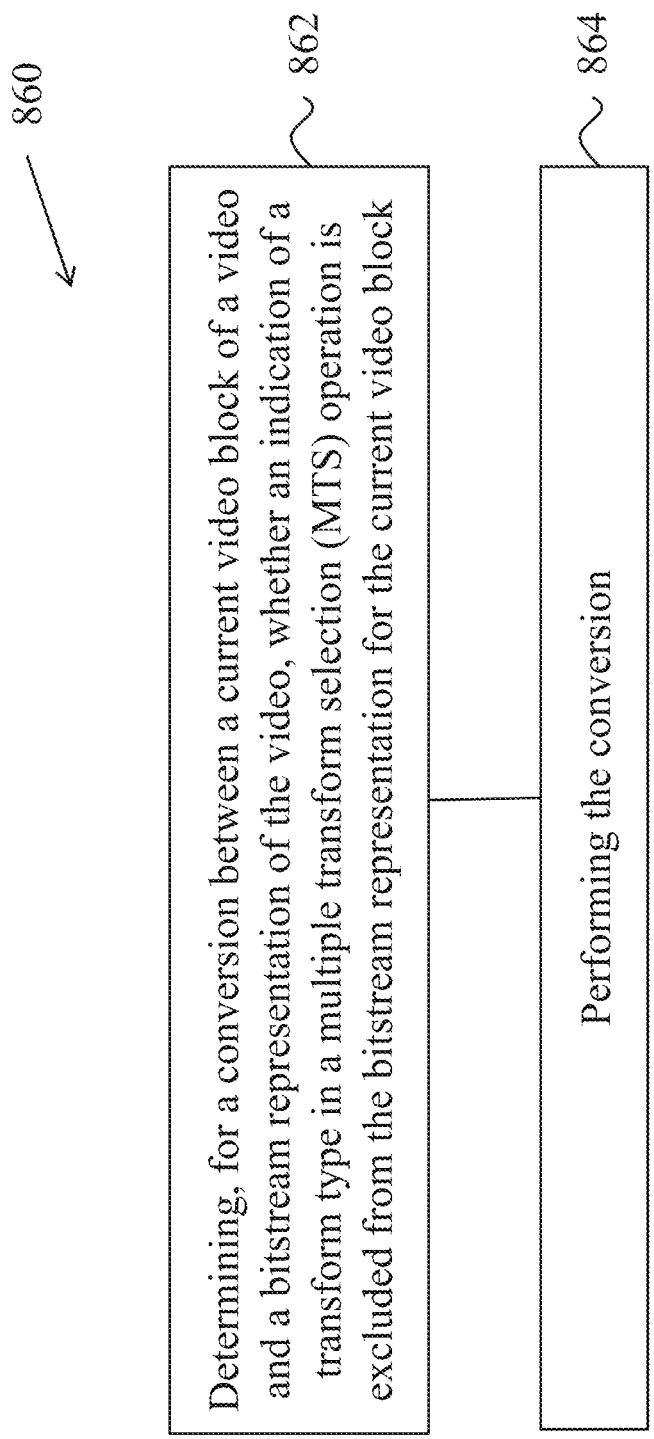

FIG. 8F shows a flowchart of an exemplary method for video processing. The method 860 includes, at step 862, determining, for a conversion between a current video block of a video and a bitstream representation of the video, whether an indication of a transform type in a multiple transform selection (MTS) operation is excluded from the bitstream representation for the current video block.

The method 860 includes, at step 864, performing the conversion. In some embodiments, the indication is in a sequence parameter set (SPS), a picture parameter set (PPS), a tile group header, a slice header, a picture header, a tile header, a coding tree unit (CTU) row, a coding unit, or a video data unit, the determining is based on a last position of a non-zero coded coefficient, and the MTS operation comprises using a transform from a plurality of predefined transform candidates for transforming a prediction error of the current video block during the conversion.

Figure 8G:
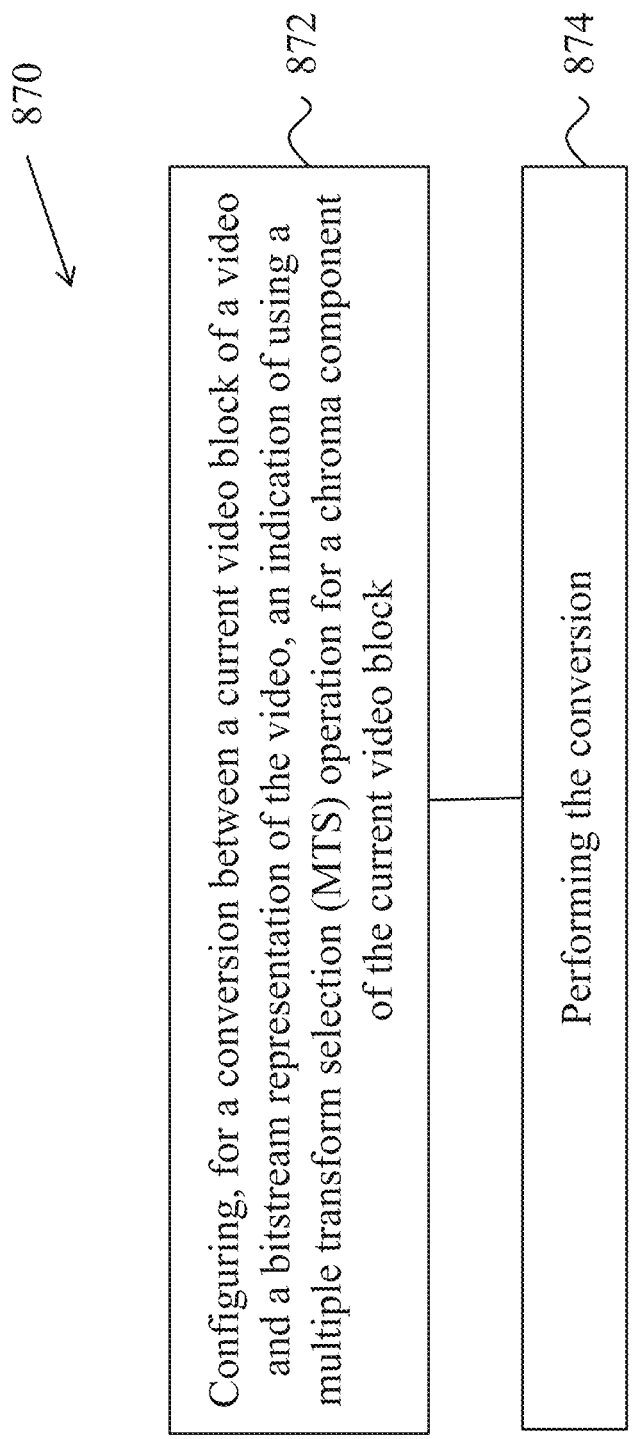

FIG. 8G shows a flowchart of an exemplary method for video processing. The method 870 includes, at step 872, configuring, for a conversion between a current video block of a video and a bitstream representation of the video, an indication of using a multiple transform selection (MTS) operation for a chroma component of the current video block.

The method 870 includes, at step 874, performing the conversion. In some embodiments, the configuring is based on a color format of the current video block, and the MTS operation comprises using a transform from a plurality of predefined transform candidates for transforming a prediction error of the current video block during the conversion.

Figure 8H:
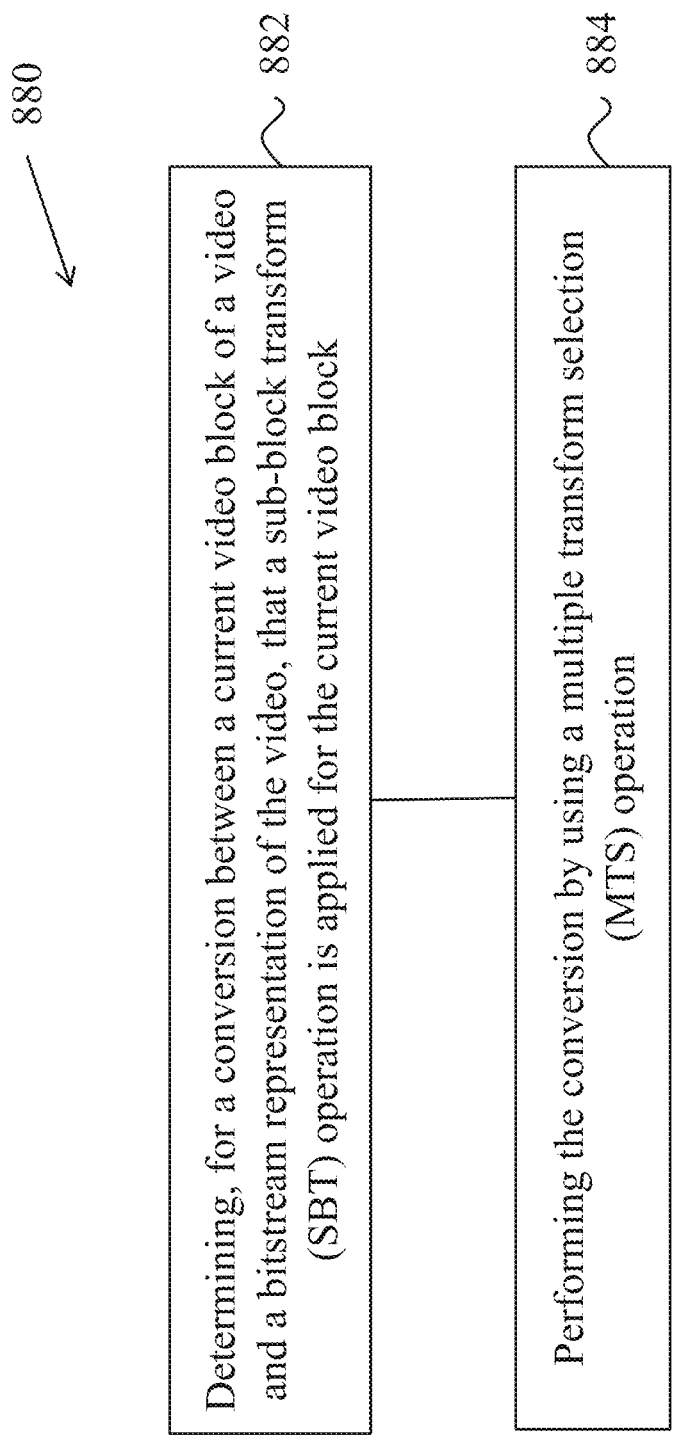
Figure 81:
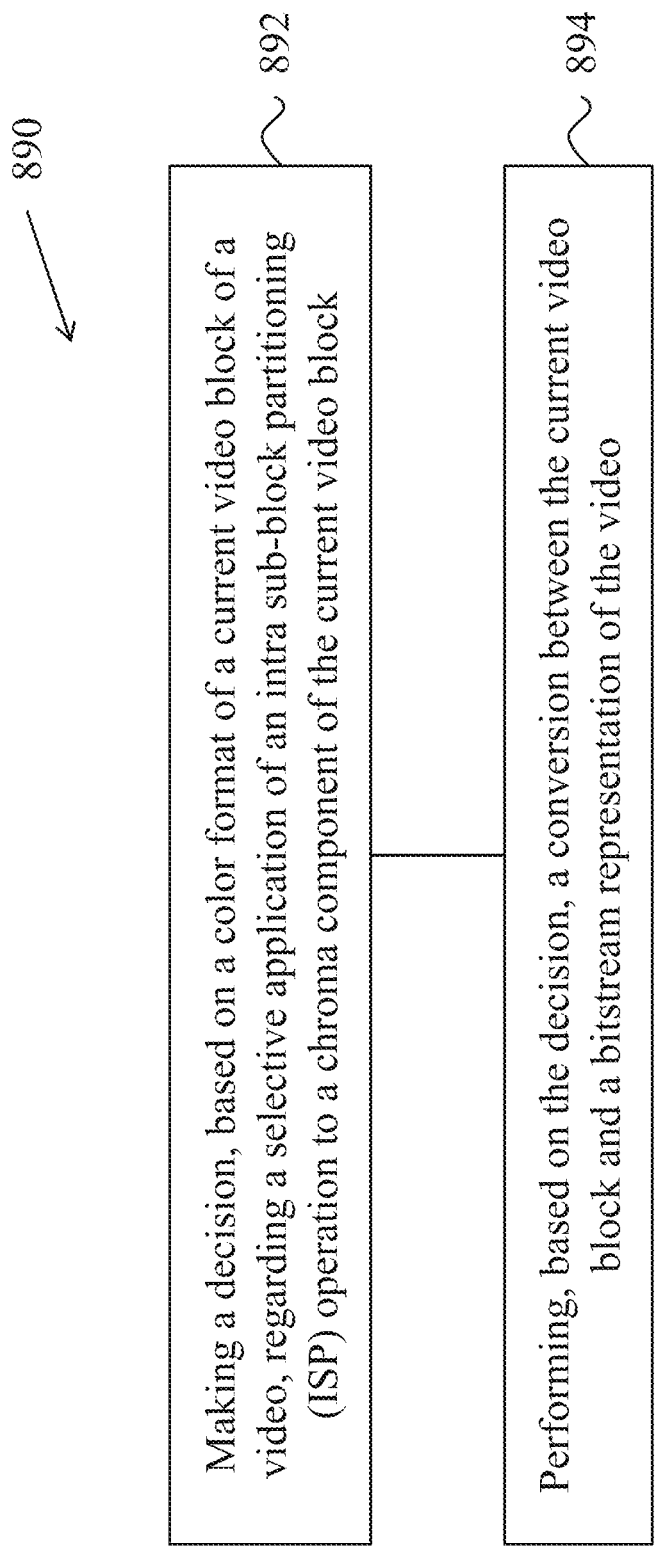

FIG. 8H shows a flowchart of an exemplary method for video processing. The method 880 includes, at step 882, determining, for a conversion between a current video block of a video and a bitstream representation of the video, that a sub-block transform (SBT) operation is applied for the current video block.

The method 880 includes, at step 884, performing the conversion by using a multiple transform selection (MTS) operation. In some embodiments, the SBT operation comprises a position-dependent transform operation, and the MTS operation comprises using a transform from a plurality of predefined transform candidates for transforming a prediction error of the current video block during the conversion.

FIG. 8I shows a flowchart of an exemplary method for video processing. The method 890 includes, at step 892, making a decision, based on a color format of a current video block of a video, regarding a selective application of an intra sub-block partitioning (ISP) operation to a chroma component of the current video block.

The method 890 includes, at step 894, performing, based on the decision, a conversion between the current video block and a bitstream representation of the video. In some embodiments, the ISP operation comprises dividing blocks vertically or horizontally into sub-partitions that have at least a predetermined number of samples.

5 Example Implementations of the Disclosed Technology

Figure 9:
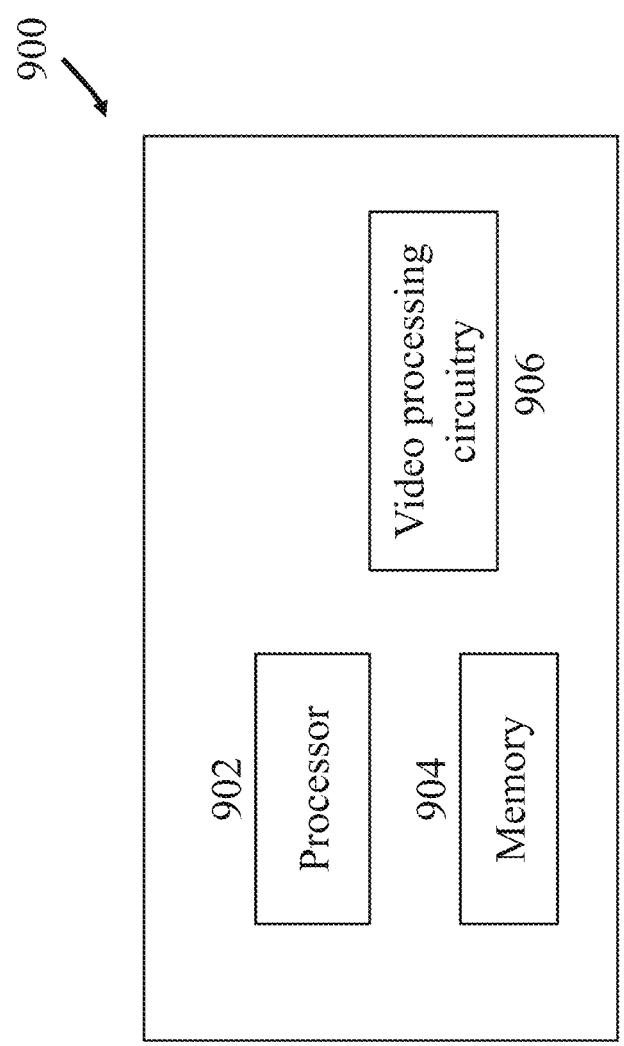
FIG. 9 is a block diagram of an example of a hardware platform for implementing a visual media decoding or a visual media encoding technique described in the present document.

FIG. 9 is a block diagram of a video processing apparatus 900. The apparatus 900 may be used to implement one or more of the methods described herein. The apparatus 900 may be embodied in a smartphone, tablet, computer, Internet of Things (IoT) receiver, and so on. The apparatus 900 may include one or more processors 902, one or more memories 904 and video processing hardware 906. The processor(s) 902 may be configured to implement one or more methods (including, but not limited to, methods 800, 810, 820, 830 and 840) described in the present document. The memory (memories) 904 may be used for storing data and code used for implementing the methods and techniques described herein. The video processing hardware 906 may be used to implement, in hardware circuitry, some techniques described in the present document.

In some embodiments, the video coding methods may be implemented using an apparatus that is implemented on a hardware platform as described with respect to FIG. 9.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Figure 10:
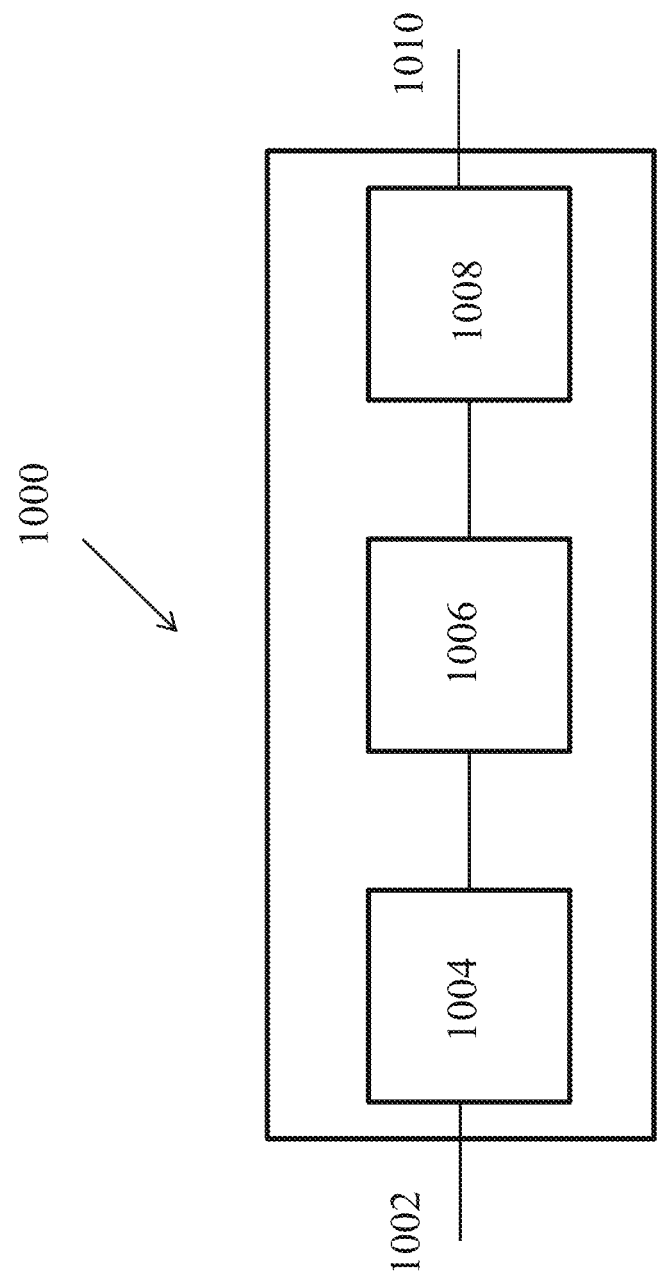
FIG. 10 is a block diagram of an example video processing system in which disclosed techniques may be implemented.

FIG. 10 is a block diagram showing an example video processing system 1000 in which various techniques disclosed herein may be implemented. Various implementations may include some or all of the components of the system 1000. The system 1000 may include input 1002 for receiving video content. The video content may be received in a raw or uncompressed format, e.g., 8 or 10 bit multi-component pixel values, or may be in a compressed or encoded format. The input 1002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1000 may include a coding component 1004 that may implement the various coding or encoding methods described in the present document. The coding component 1004 may reduce the average bitrate of video from the input 1002 to the output of the coding component 1004 to produce a coded representation of the video. The coding techniques are therefore sometimes called video compression or video transcoding techniques. The output of the coding component 1004 may be either stored, or transmitted via a communication connected, as represented by the component 1006. The stored or communicated bitstream (or coded) representation of the video received at the input 1002 may be used by the component 1008 for generating pixel values or displayable video that is sent to a display interface 1010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

In the following embodiments, additions are shown using bolded double curly braces, e.g., {{a}} indicates that "a" has been added, and deletions are shown using double bolded brackets, e.g., [[b]] indicates that "b" has been deleted.

5.1 Embodiment #1

This section shows an example on separate control of MTS for IBC and inter coded blocks.

7.3.2.3 Sentience Parameter Set RBSP Syntax

| | Descriptor |
|---|---|
| seq_parameter_set_rbsp( ) { | |
|   sps_decoding_parameter_set_id | u(4) |
| ... | |
|   if( ( CtbSizeY / MinCbSizeY + 1 ) <= ( | |
|   pic_width_in_luma_samples / MinCbSizeY − 1 ) ) { | |
|     sps_ref_wraparound_enabled_flag | u(1) |
|     if( sps_ref_wraparound_enabled_flag ) | |
|       sps_ref_wraparound_offset_minus1 | ue(v) |
|   } | |
|   sps_temporal_mvp_enabled_flag | u(1) |
|   if( sps_temporal_mvp_enabled_flag ) | |
|     sps_sbtmvp_enabled_flag | u(1) |
|   sps_amvr_enabled_flag | u(1) |
|   sps_bdof_enabled_flag | u(1) |
|   sps_affine_amvr_enabled_flag | u(1) |
|   sps_dmvr_enabled_flag | u(1) |
|   sps_cclm_enabled_flag | u(1) |
|   if( sps_cclm_enabled_flag && chroma_format_idc == 1 ) | |
|     sps_cclm_colocated_chroma_flag | u(1) |
|   sps_mts_enabled_flag | u(1) |
|   if( sps_mts_enabled_flag ) { | |
|     sps_explicit_mts_intra_enabled_flag | u(1) |
|     sps_explicit_mts_inter_enabled_flag | u(1) |
|     {{ sps_explicit_mts_ibc_enabled_flag | u(1) }} |
|   } | |
|   sps_sbt_enabled_flag | u(1) |
|   if( sps_sbt_enabled_flag ) | |
|     sps_sbt_max_size_64_flag | u(1) |
|   sps_affine_enabled_flag | u(1) |
|   if( sps_affine_enabled_flag ) | |
|     sps_affine_type_flag | u(1) |
|   sps_gbi_enabled_flag | u(1) |
|   sps_ibc_enabled_flag | u(1) |
|   sps_ciip_enabled_flag | u(1) |
|   sps_fpel_mmvd_enabled_flag | u(1) |
|   sps_triangle_enabled_flag | u(1) |
|   sps_lmcs_enabled_flag | u(1) |
| ... | |
|   rbsp_trailing_bits( ) | |
| } | |

Alternatively, conditional signaling may be utilized.

| | Descriptor |
|---|---|
| seq_parameter_set_rbsp( ) { | |
|   sps_decoding_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gra_enabled_flag | u(1) |
|   sps_seq_parameter_set_id | ue(v) |
|   chroma_format_idc | ue(v) |

|  | Descriptor |
|---|---|
| if( chroma_format_idc = = 3 ) | |
|    separate_colour_plane_flag | u(1) |
| ... | |
| sps_dmvr_enabled_flag | u(1) |
| sps_cclm_enabled_flag | u(1) |
| if( sps_cclm_enabled_flag && chroma_format_idc = = 1 ) | |
|    sps_cclm_colocated_chroma_flag | u(1) |
| {{ sps_ibc_enabled_flag | u(1) }} |
| sps_mts_enabled_flag | u(1) |
| if( sps_mts_enabled_flag ) { | |
|    sps_explicit_mts_intra_enabled_flag | u(1) |
|    sps_explicit_mts_inter_enabled_flag | u(1) |
| {{   if ( sps_ibc_enabled_flag ) { | |
|     sps_explicit_mts_ibc_enabled_flag | u(1) |
|   } }} | |
| } | |

|  | Descriptor |
|---|---|
| sps_sbt_enabled_flag | u(1) |
| if( sps_sbt_enabled_flag ) | |
|    sps_sbt_max_size_64_flag | u(1) |
| sps_affine_enabled_flag | u(1) |
| if( sps_affine_enabled_flag ) | |
|    sps_affine_type_flag | u(1) |
| sps_gbi_enabled_flag | u(1) |
| [[ sps_ibc_enabled_flag | u(1) ]] |
| sps_ciip_enabled_flag | u(1) |
| sps_fpel_mmvd_enabled_flag | u(1) |
| sps_triangle_enabled_flag | u(1) |
| sps_lmcs_enabled_flag | u(1) |
| ... | |
| rbsp_trailing_bits( ) | |
| } | |

7.3.7.10 Transform Unit Syntax

|  | Descriptor |
|---|---|
| transform_unit( x0, y0, tbWidth, tbHeight, treeType, subTuIndex ) { | |
|   if( treeType = = SINGLE_TREE \|\| treeType = = DUAL_TREE_LUMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) \|\| | |
|        ( subTuIndex = = 1 && !cu_sbt_pos_flag ) ) ) ) \|\| | |
|      ( IntraSubPartitionsSplitType != ISP_NO_SPLIT && | |
|      ( subTuIndex < NumIntraSubPartitions − 1 \|\| !InferTuCbfLuma ) ) ) | |
|      tu_cbf_luma[ x0 ][ y0 ] | ae(v) |
|     if (IntraSubPartitionsSplitType != ISP_NO_SPLIT ) | |
|      InferTuCbfLuma = InferTuCbfLuma && !tu_cbf_luma[ x0 ][ y0 ] | |
|   } | |
|   if( ( treeType = = SINGLE_TREE \|\| treeType = = DUAL_TREE_CHROMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) \|\| | |
|        ( subTuIndex = = 1 && !cu_sbt_pos_flag ) ) ) ) \|\| | |
|      ( IntraSubPartitionsSplitType != ISP_NO_SPLIT && | |
|      ( subTuIndex = = NumIntraSubPartitions − 1 ) ) ) { | |
|     tu_cbf_cb[ x0 ][ y0 ] | ae(v) |
|     tu_cbf_cr[ x0 ][ y0 ] | ae(v) |
|     } | |
|   } | |
|   if( IntraSubPartitionsSplitType != ISP_NO_SPLIT && | |
|     treeType = = SINGLE_TREE && subTuIndex = = NumIntraSubPartitions − 1 ) ) | |
|     xC = CbPosX[ x0 ][ y0 ] | |
|     yC = CbPosY[ x0 ][ y0 ] | |
|     wC = CbWidth[ x0 ][ y0 ] / 2 | |
|     hC = CbHeight[ x0 ][ y0 ] / 2 | |
|   } else | |
|     xC = x0 | |
|     yC = y0 | |
|     wC = tbWidth / SubWidthC | |
|     hC = tbHeight / SubHeightC | |
|   } | |
|   if( ( tu_cbf_luma[ x0 ][ y0 ] \|\| tu_cbf_cb[ x0 ][ y0 ] \|\| tu_cbf_cr[ x0 ][ y0 ] ) && | |
|     treeType != DUAL_TREE_CHROMA ) { | |
|     if( cu_qp_delta_enabled_flag && !IsCuQpDeltaCoded ) { | |
|      cu_qp_delta_abs | ae(v) |
|      if( cu_qp_delta_abs ) | |
|       cu_qp_delta_sign_flag | ae(v) |
|     } | |
|   } | |
|   if( tu_cbf_luma[ x0 ][ y0 ] && treeType != DUAL_TREE_CHROMA | |
|     && ( tbWidth <= 32 ) && ( tbHeight <= 32 ) | |
|     && ( IntraSubPartitionsSplit[ x0 ][ y0 ] = = ISP_NO_SPLIT ) && ( !cu_sbt_flag ) ) { | |
|     if( transform_skip_enabled_flag && tbWidth <= MaxTsSize && tbHeight <= MaxTsSize ) | |
|      transform_skip_flag[ x0 ][ y0 ] | ae(v) |
|     if( ( {{( CuPredMode[ x0 ][ y0 ] = = MODE_IBC && sps_explicit_mts_ibc_enabled_flag ) | |
|      \|\| ( CuPredMode[ x0 ][ y0 ] = = MODE_INTER && sps_explicit_mts_inter_enabled_flag ) }} | |
| [[ ( CnPredMode[ x0 ][ y0 ] != MODE_INTRA && sps_explicit_mts_inter_enabled_flag ) ]] | |
|      \|\| ( CuPredMode[ x0 ][ y0 ] = = MODE_INTRA && sps_explicit_mts_intra_enabled_flag )) | |
|      && ( tbWidth <= 32 ) && ( tbHeight <= 32 ) && ( !transform_skip_flag[ x0 ][ y0 ] ) ) | |
|     tu_mts_idx[ x0 ][ y0 ] | ae(v) |
|   } | |

```
                                                                                        Descriptor if( tu_cbf_luma[ x0 ][ y0 ] )
      residual_coding( x0, y0, Log2( tbWidth ), Log2( tbHeight ), 0 )
  if( tu_cbf_cb[ x0 ][ y0 ] )
      residual_coding( xC, yC, Log2( wC ), Log2( hC ), 1 )
  if( tu_cbf_cr[ x0 ][ y0 ] )
      residual_coding( xC, yC, Log2( wC ), Log2( hC ), 2 )
}
``` sps_explicit_mts_intra_enabled_flag equal to 1 specifies that tu_mts_idx may be present in the transform unit syntax for intra coding units. sps_explicit_mts_intra_enabled_flag equal to 0 specifies that tu_mts_idx is not present in the transform unit syntax for intra coding units. When not present, the value of sps_explicit_mts_intra_enabled_flag is inferred to be equal to 0.

sps_explicit_mts_inter_enabled_flag equal to 1 specifies that tu_mts_idx may be present in the transform unit syntax for inter coding units. sps_explicit_mts_inter_enabled_flag equal to 0 specifies that tu_mts_idx is not present in the transform unit syntax for inter coding units. When not present, the value of sps_explicit_mts_inter_enabled_flag is inferred to be equal to 0.

{{sps_explicit_mts_ibc_enabled_flag equal to 1 specifies that tu_mts_idx may be present in the transform unit syntax for IBC coding units. sps_explicit_mts_ibc_enabled_flag equal to 0 specifies that tu_mts_idx is not present in the transform unit syntax for IBC coding units. When not present, the value of sps_explicit_mts_ibc_enabled_flag is inferred to be equal to 0.}}

5.2 Embodiment #2

This section shows an example on joint control of MTS for IBC and inter coded blocks.

The current syntax design is kept unchanged, however, the semantics are modified as follows:

sps_explicit_mts_intra_enabled_flag equal to 1 specifies that tu_mts_idx may be present in the transform unit syntax for intra coding units. sps_explicit_mts_intra_enabled_flag equal to 0 specifies that tu_mts_idx is not present in the transform unit syntax for intra coding units. When not present, the value of sps_explicit_mts_intra_enabled_flag is inferred to be equal to 0.

sps_explicit_mts_inter_enabled_flag equal to 1 specifies that tu_mts_idx may be present in the transform unit syntax for {{non-intra}} [[inter]] coding units. sps_explicit_mts_inter_enabled_flag equal to 0 specifies that tu_mts_idx is not present in the transform unit syntax for inter coding units. When not present, the value of sps_explicit_mts_inter_enabled_flag is inferred to be equal to 0.

Alternatively, the semantics may be modified as follows:

sps_explicit_mts_inter_enabled_flag equal to 1 specifies that tu_mts_idx may be present in the transform unit syntax for inter {{and IBC}} coding units. sps_explicit_mts_inter_enabled_flag equal to 0 specifies that tu_mts_idx is not present in the transform unit syntax for inter coding units. When not present, the value of sps_explicit_mts_inter_enabled_flag is inferred to be equal to 0.

In some embodiments, the following technical solutions may be implemented:

A1. A method for video processing, comprising: determining, for a conversion between a current video block of a video and a bitstream representation of the video, that an indication of a transform type in a multiple transform selection (MTS) operation is excluded from the bitstream representation, and wherein the current video block is coded using an intra block copy (IBC) mode; and performing the conversion, wherein the indication is in a sequence parameter set (SPS), a picture parameter set (PPS), a tile group header, a slice header, a picture header, a tile header, a coding tree unit (CTU) row, a coding unit, or a video data unit, and wherein the MTS operation comprises using a transform from a plurality of predefined transform candidates for transforming a prediction error of the current video block during the conversion.

A2. A method for video processing, comprising: making a decision, based on a coding mode of a current video block of a video, regarding a selective application of a multiple transform selection (MTS) operation; and performing, based on the decision, a conversion between the current video block and a bitstream representation of the video, wherein the MTS operation comprises using a transform from a plurality of predefined transform candidates for transforming a prediction error of the current video block during the conversion.

A3. The method of solution A2, wherein the MTS operation is an implicit MTS operation, and wherein a transform index of the MTS operation is excluded from the bitstream representation.

A4. The method of solution A2 or A3, wherein the coding mode is an intra block copy (IBC) mode.

A5. The method of solution A2 or A3, wherein the MTS operation is applied identically when the coding mode is an intra block copy mode or an intra mode.

A6. The method of solution A5, wherein the current video block is a square block, and wherein a Discrete Cosine Transform Type II (DCT-II) is applied.

A7. The method of solution A5, wherein the current video block is a non-square block, wherein a Discrete Cosine Transform Type II (DCT-II) is applied to a longer side of the current video block, and wherein a DCT-VII is applied to a shorter side of the current video block.

A8. The method of solution A2 or A3, wherein the coding mode is an intra block (IBC) copy mode, wherein the current video block is a square block, and wherein a Discrete Cosine Transform Type VII (DCT-VII) is applied.

A9. The method of solution A2 or A3, wherein the coding mode is an intra block copy (IBC) mode, wherein the current video block is a non-square block, and wherein a transform skip is applied to a shorter side of the current video block.

A10. The method of solution A2 or A3, wherein the coding mode is a block differential pulse code modulation (BDPCM) mode, a DPCM mode, a residual BDPCM (RBDPCM) mode or an affine linear weighted intra prediction (ALWIP) mode.

A11. The method of solution A2 or A3, wherein the coding mode is an angular intra-prediction mode.

A12. The method of solution A2, wherein the bitstream representation comprises an indication of a set of allowed transforms, the indication being determined based on the coding mode of the current video block.

A13. The method of solution A12, wherein the coding mode is an intra block copy (IBC) mode.

A14. The method of solution A12, wherein the coding mode is a combined intra and inter prediction (CIIP) mode.

A15. The method of solution A12, wherein the coding mode is a block differential pulse code modulation (BDPCM) mode, a DPCM mode, a residual BDPCM (RBDPCM) mode or an affine linear weighted intra prediction (ALWIP) mode.

A16. The method of solution A12, wherein the coding mode is an angular intra-prediction mode.

A17. A method for video processing, comprising: configuring, based on a characteristic of a current video block, a context model for coding at least one index of a multiple transform selection (MTS) operation; and performing, based on the configuring, a conversion between the current video block and a bitstream representation of a video comprising the current video block, wherein the MTS operation comprises using a transform from a plurality of predefined transform candidates for transforming a prediction error of the current video block during the conversion.

A18. The method of solution A17, wherein the characteristic comprises a coding mode of the current video block.

A19. The method of solution A18, wherein the coding mode comprises an intra coding mode or an inter coding mode or inter block copy (IBC).

A20. The method of solution A18, wherein the coding mode comprises an inter coding mode or a non-inter coding mode.

A21. The method of solution A17, wherein the characteristic comprises a shape information associated with the current video block.

A22. The method of solution A21, wherein the shape information comprises the current video block being square or non-square.

A23. The method of solution A21, wherein the shape information comprises a width of the current video block being less than a height of the current video block.

A24. The method of solution A21, wherein the shape information comprises a width of the current video block being greater than a height of the current video block.

A25. The method of solution A21, wherein the shape information comprises a ratio of a width of the current video block to a height of the current video block.

A26. A method for video processing, comprising: determining, during a conversion between a current video block and a bitstream representation of a video comprising the current video block, that the conversion comprises a multiple transform selection (MTS) operation; and coding, based on the determining, one or more horizontal indices and one or more vertical indices of matrices of the MTS operation separately, wherein the MTS operation comprises using a transform from a plurality of predefined transform candidates for transforming a prediction error of the current video block during the conversion.

A27. The method of solution A26, wherein the one or more horizontal indices and/or the one or more vertical indices comprises a transform skip operation.

A28. The method of solution A26, wherein a context model for the one or more horizontal indices is based on the one or more vertical indices.

A29. The method of solution A26, wherein a context model for the one or more vertical indices is based on the one or more horizontal indices.

A30. A method for video processing, comprising: configuring, for a conversion between a current video block of a video and a bitstream representation of the video, an indication of a transform type in a multiple transform selection (MTS) operation for the current video block that is coded using an intra block copy (IBC) mode; and performing the conversion, wherein the indication is in a sequence parameter set (SPS), a picture parameter set (PPS), a tile group header, a slice header, a picture header, a tile header, a coding tree unit (CTU) row, or a video data unit, and wherein the MTS operation comprises using a transform from a plurality of predefined transform candidates for transforming a prediction error of the current video block during the conversion.

A31. The method of solution A30, wherein the indication is conditionally coded in the bitstream representation based on whether the MTS operation and the IBC mode are explicitly coded in the SPS, the PPS, the tile group header, the slice header, the picture header, the tile header, the CTU row, or the video data unit.

A32. The method of solution A30, wherein the indication is conditionally coded in the bitstream representation based on whether the MTS operation is enabled for inter coded video blocks.

A33. The method of solution A30, wherein the SPS comprises the indication, and wherein the indication further configures using the MTS operation for inter coded video blocks.

A34. The method of solution A30, wherein the indication is based on a number of non-zero coded coefficients.

A35. The method of solution A30, wherein the indication is based on a sum of absolute values of non-zero coded coefficients.

A36. The method of any of solutions A1 to A35, wherein the conversion generates the current video block from the bitstream representation.

A37. The method of any of solutions A1 to A35, wherein the conversion generates the bitstream representation from the current video block.

A38. An apparatus in a video system comprising a processor and a non-transitory memory with instructions thereon, wherein the instructions upon execution by the processor, cause the processor to implement the method in any one of solutions A1 to A37.

A39. A computer program product stored on a non-transitory computer readable media, the computer program product including program code for carrying out the method in any one of solutions A1 to A37.

In some embodiments, the following technical solutions may be implemented:

B1. A method for video processing, comprising: determining, for a conversion between a current video block of a video and a bitstream representation of the video, whether an indication of a transform type in a multiple transform selection (MTS) operation is excluded from the bitstream representation for the current video block; and performing the conversion, wherein the indication is in a sequence parameter set (SPS), a picture parameter set (PPS), a tile group header, a slice header, a picture header, a tile header, a coding tree unit (CTU) row, a coding unit, or a video data unit, wherein the determining is based on a last position of a non-zero coded coefficient, and wherein the MTS operation comprises using a transform from a plurality of predefined transform candidates for transforming a prediction error of the current video block during the conversion.

B2. A method for video processing, comprising: configuring, for a conversion between a current video block of a video and a bitstream representation of the video, an indication of using a multiple transform selection (MTS) operation for a chroma component of the current video block; and performing the conversion, wherein the configuring is based on a color format of the current video block, and wherein the MTS operation comprises using a transform from a plurality of predefined transform candidates for transforming a prediction error of the current video block during the conversion.

B3. The method of solution B2, wherein the MTS operation is applied to the chroma component upon a determination that the color format is 4:4:4.

B4. The method of solution B2, wherein the MTS operation is applied to the chroma component, and wherein two blocks of a color component use identical transform matrices.

B5. The method of solution B2, wherein the MTS operation is applied to the chroma component, and wherein two blocks of a color component use different transform matrices.

B6. The method of solution B2, wherein an inclusion of the indication in the bitstream representation is based on the color format or a usage of a separate plane coding.

B7. A method for video processing, comprising: determining, for a conversion between a current video block of a video and a bitstream representation of the video, that a sub-block transform (SBT) operation is applied for the current video block; and performing the conversion by using a multiple transform selection (MTS) operation, wherein the SBT operation comprises a position-dependent transform operation, and wherein the MTS operation comprises using a transform from a plurality of predefined transform candidates for transforming a prediction error of the current video block during the conversion.

B8. The method of solution B7, wherein the coding mode is an intra block copy (IBC) mode.

B9. The method of solution B7, wherein the SBT operation is applied identically when the coding mode is an intra block copy mode or an intra mode.

B10. The method of solution B7, wherein the coding mode is a block differential pulse code modulation (BDPCM) mode, a DPCM mode, a residual BDPCM (RBDPCM) mode or an affine linear weighted intra prediction (ALWIP) mode.

B11. The method of solution B7, wherein the coding mode is an angular intra-prediction mode.

B12. A method for video processing, comprising: making a decision, based on a color format of a current video block of a video, regarding a selective application of an intra sub-block partitioning (ISP) operation to a chroma component of the current video block; and performing, based on the decision, a conversion between the current video block and a bitstream representation of the video, wherein the ISP operation comprises dividing blocks vertically or horizontally into sub-partitions that have at least a predetermined number of samples.

B13. The method of solution B12, wherein the ISP operation is applied to the chroma component, and wherein the color format is 4:4:4.

B14. The method of solution B12, wherein the ISP operation is applied to the chroma component, and wherein a configuration of the ISP operation is based on one or more of (i) a height or a width of the current video block, (ii) whether a cross-component linear model (CCLM) prediction method is applied to the current video block, (iii) whether joint chroma residual coding is applied to the current video block, (iv) an intra prediction direction, or (v) whether an intra prediction mode is derived from a luma component of the current video block.

B15. The method of solution B12, wherein the ISP operation is applied to the chroma component, and wherein a configuration of the ISP operation is based on reconstructed samples or coded information of chroma components of one or more neighboring blocks.

B16. The method of any of solutions B11 to B15, wherein the conversion generates the current video block from the bitstream representation.

B17. The method of any of solutions B11 to B15, wherein the conversion generates the bitstream representation from the current video block.

B18. An apparatus in a video system comprising a processor and a non-transitory memory with instructions thereon, wherein the instructions upon execution by the processor, cause the processor to implement the method in any one of solutions B1 to B17.

B19. A computer program product stored on a non-transitory computer readable media, the computer program product including program code for carrying out the method in any one of solutions B1 to B17.

In some embodiments, the following technical solutions may be implemented:

C1. A method for video processing, comprising: making a decision, based on a coding mode of a current video block, regarding a selective application of a multiple transform selection (MTS) operation; and performing, based on the decision, a conversion between the current video block and a bitstream representation of a video comprising the current video block, wherein the MTS operation comprises using a transform from a plurality of predefined transform candidates.

C2. The method of solution C1, wherein the MTS operation comprises implicit signaling of one or more indexes of transforms in the MTS operation.

C3. The method of solution C2, wherein the coding mode is an intra block copy (IBC) mode.

C4. The method of solution C2, wherein the MTS operation is applied identically when the coding mode is an intra block copy mode or an intra mode.

C5. The method of solution C4, wherein the current video block is a square block, and wherein a Discrete Cosine Transform Type II (DCT-II) is applied.

C6. The method of solution C4, wherein the current video block is a non-square block, wherein a Discrete Cosine Transform Type II (DCT-II) is applied to a longer side of the current video block, and wherein a DCT-VII is applied to a shorter side of the current video block.

C7. The method of solution C2, wherein the coding mode is an intra block copy (IBC) mode, wherein the current video block is a square block, and wherein a Discrete Cosine Transform Type VII (DCT-VII) is applied.

C8. The method of solution C2, wherein the coding mode is an intra block copy (IBC) mode, wherein the current video block is a non-square block, and wherein a transform skip is applied to a shorter side of the current video block.

C9. The method of solution C2, wherein the coding mode is a block differential pulse code modulation (BDPCM) mode, a DPCM mode, a residual BDPCM (RBDPCM) mode or an affine linear weighted intra prediction (ALWIP) mode.

C10. The method of solution C2, wherein the coding mode is an angular intra-prediction mode.

C11. The method of solution C1, wherein the MTS operation comprises a set of allowed transforms that is determined based on the coding mode of the current video block.

C12. The method of solution C11, wherein the coding mode is an intra block copy (IBC) mode.

C13. The method of solution C11, wherein the coding mode is a combined intra and inter prediction (CIIP) mode.

C14. The method of solution C11, wherein the coding mode is a block differential pulse code modulation (BDPCM) mode, a DPCM mode, a residual BDPCM (RBDPCM) mode or an affine linear weighted intra prediction (ALWIP) mode.

C15. The method of solution C11, wherein the coding mode is an angular intra-prediction mode.

C16. A method for video processing, comprising: configuring, based on a characteristic of a current video block, a context model for coding an index of a multiple transform selection (MTS) operation; and performing, based on the configuring, a conversion between the current video block and a bitstream representation of a video comprising the current video block, wherein the MTS operation comprises using a transform from a plurality of predefined transform candidates.

C17. The method of solution C16, wherein the characteristic comprises coded mode information of the current video block.

C18. The method of solution C17, wherein the coded mode information comprises intra or inter or inter block copy (IBC).

C19. The method of solution C17, wherein the coded mode information comprises inter or non-inter.

C20. The method of solution C16, wherein the characteristic comprises a shape information of the current video block.

C21. The method of solution C20, wherein the shape information comprises whether the current video block is square or non-square.

C22. The method of solution C20, wherein the shape information comprises whether a width of the current video block is less than a height of the current video block.

C23. The method of solution C20, wherein the shape information comprises whether a width of the current video block is greater than a height of the current video block.

C24. The method of solution C20, wherein the shape information comprises a ratio of a width of the current video block to a height of the current video block.

C25. A method for video processing, comprising: determining, during a conversion between a current video block and a bitstream representation of a video comprising the current video block, that the conversion comprises a multiple transform selection (MTS) operation; and coding one or more horizontal indices and one or more vertical indices of matrices of the MTS operation separately, wherein the MTS operation comprises using a transform from a plurality of predefined transform candidates.

C26. The method of solution C25, wherein the one or more horizontal indices or the one or more vertical indices comprises a transform skip flag.

C27. The method of solution C25, wherein a context model for the one or more horizontal indices is based on the one or more vertical indices.

C28. The method of solution C25, wherein a context model for the one or more vertical indices is based on the one or more horizontal indices.

C29. The method of solution C1, wherein the coding mode is an intra block copy (IBC) mode, an wherein the decision is based on signaling in a sequence parameter set (SPS), a picture parameter set (PPS), a tile group header, a slice header, a picture header, a tile header, a coding tree unit (CTU) row or a video data unit.

C30. The method of solution C1, wherein the coding mode is an intra block copy (IBC) mode, an wherein the decision is based on a number of non-zero coded coefficients.

C31. The method of solution C1, wherein the coding mode is an intra block copy (IBC) mode, an wherein the decision is based on a sum of absolute values of non-zero coded coefficients.

C32. The method of solution C1, wherein the coding mode is an intra block copy (IBC) mode, an wherein the decision is based on a last position of a non-zero coded coefficient.

C33. The method of solution C1, wherein the selective application of the MTS operation comprises a selective application to a chroma component of the current video block, and wherein the decision is based on a color format of the current video block.

C34. The method of solution C33, wherein the MTS operation is applied to the chroma component, and wherein the color format is 4:4:4.

C35. The method of solution C33, wherein the MTS operation is applied to the chroma component, and wherein two blocks of a color component use identical transform matrices.

C36. The method of solution C33, wherein the MTS operation is applied to the chroma component, and wherein two blocks of a color component use different transform matrices.

C37. The method of solution C33, further comprising: making a decision, based on the color format of the current video block, regarding signaling an index of the MTS operation for the chroma component.

C38. A method for video processing, comprising: making a decision, based on a coding mode of a current video block, regarding a selective application of a sub-block transform (SBT) operation; and performing, based on the decision, a conversion between the current video block and a bitstream representation of a video comprising the current video block, wherein the SBT operation comprises using a position-dependent transform on luma transform blocks associated with the current video block.

C39. The method of solution C38, wherein the coding mode is an intra block copy (IBC) mode.

C40. The method of solution C38, wherein the SBT operation is applied identically when the coding mode is an intra block copy mode or an intra mode.

C41. The method of solution C38, wherein the coding mode is a block differential pulse code modulation (BDPCM) mode, a DPCM mode, a residual BDPCM (RBDPCM) mode or an affine linear weighted intra prediction (ALWIP) mode.

C42. The method of solution C38, wherein the coding mode is an angular intra-prediction mode.

C43. A method for video processing, comprising: making a decision, based on a color format of a current video block, regarding a selective application of an intra sub-block partitioning (ISP) operation to a chroma component of the current video block; and performing, based on the decision, a conversion between the current video block and a bitstream representation of a video comprising the current video block, wherein the ISP operation comprises dividing blocks vertically or horizontally into sub-partitions that have at least a predetermined number of samples.

C44. The method of solution C43, wherein the ISP operation is applied to the chroma component, and wherein the color format is 4:4:4.

C45. The method of solution C43, wherein the ISP operation is applied to the chroma component, and wherein a configuration of the ISP operation is based on one or more of (i) a height or a width of the current video block, (ii) whether a cross-component linear model (CCLM) prediction method is applied to the current video block, (iii) whether joint chroma residual coding is applied to the current video block, (iv) an intra prediction direction, or (v) whether an intra prediction mode is derived from a luma component of the current video block.

C46. The method of solution C43, wherein the ISP operation is applied to the chroma component, and wherein a configuration of the ISP operation is based on reconstructed samples or coded information of chroma components of one or more neighboring blocks.

C47. An apparatus in a video system comprising a processor and a non-transitory memory with instructions thereon, wherein the instructions upon execution by the processor, cause the processor to implement the method in any one of solutions C1 to C46.

C48. A computer program product stored on a non-transitory computer readable media, the computer program product including program code for carrying out the method in any one of solutions C1 to C46.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodi-

What is claimed is:

1. A method of processing video data, comprising:
determining, for a conversion between a current video block of a video and a bitstream of the video, whether an indication of a transform type in a multiple transform selection operation is included in the bitstream at least based on whether the current video block is coded using an intra block copy mode; and
performing the conversion based on the determining,
wherein the multiple transform selection operation comprises using a transform from a plurality of predefined transform candidates during the conversion,
wherein, in case that the current video block is coded using the intra block copy mode, the indication is excluded from the bitstream,
wherein, whether the indication is included in the bitstream is further based on a position of a last non-zero coefficient of the current video block,
wherein, whether to implicitly apply the multiple transform selection operation is based on whether the current video block is coded with a matrix-based intra prediction mode,
wherein, whether the indication of the transform type in the multiple transform selection operation is included in the bitstream is at least based on a tree type of the current video block, and
wherein, in response to the current video block being a chroma component that is partitioned using a dual tree from a coding tree unit, the indication is excluded from the bitstream, and when the indication is excluded from the bitstream, a value of the indication is inferred to be equal to a default value.

2. The method of claim 1, wherein, in response to the indication being included in the bitstream, the indication is in a sequence parameter set, a picture parameter set, a tile group header, a slice header, a picture header, a tile header, a coding tree unit row, a coding unit, or a video data unit.

3. The method of claim 1, wherein whether the indication is included in the bitstream is further based on at least one of a first syntax element in a sequence parameter set indicting whether the indication is allowed to present in the bitstream for an intra coding unit, or a second syntax element in a sequence parameter set indicting whether the indication is allowed to present in the bitstream for an inter coding unit.

4. The method of claim 1, wherein, in response to a value of a third syntax element indicting a transform not applied to an associated transform block of the current video block, the indication is excluded from the bitstream.

5. The method of claim 1, wherein the transform type of the multiple transform selection operation comprises a Discrete Cosine Transform Type II (DCT-II), a Discrete Sine Transform Type VII (DST-VII), or a Discrete Cosine Transform Type VIII (DCT-VIII).

6. The method of claim 1, wherein for an intra block copy mode coded block, its prediction is derived from blocks of sample values of a same slice as determined by block vectors.

7. The method of claim 1, wherein the conversion includes encoding the current video block into the bitstream.

8. The method of claim 1, wherein the conversion includes decoding the current video block from the bitstream.

9. An apparatus for processing video data comprising a processor and a non-transitory memory with instructions thereon, wherein the instructions upon execution by the processor, cause the processor to:
determine, for a conversion between a current video block of a video and a bitstream of the video, whether an indication of a transform type in a multiple transform selection operation is included in the bitstream at least based on whether the current video block is coded using an intra block copy mode; and
perform the conversion based on the determining,
wherein the multiple transform selection operation comprises using a transform from a plurality of predefined transform candidates during the conversion,
wherein, in case that the current video block is coded using the intra block copy mode, the indication is excluded from the bitstream,
wherein, whether the indication is included in the bitstream is further based on a position of a last non-zero coefficient of the current video block,
wherein, whether to implicitly apply the multiple transform selection operation is based on whether the current video block is coded with a matrix-based intra prediction mode,
wherein, whether the indication of the transform type in the multiple transform selection operation is included in the bitstream is at least based on a tree type of the current video block, and
wherein, in response to the current video block being a chroma component that is partitioned using a dual tree from a coding tree unit, the indication is excluded from the bitstream, and when the indication is excluded from the bitstream, a value of the indication is inferred to be equal to a default value.

10. The apparatus of claim 9, wherein, in response to the indication being included in the bitstream, the indication is in a sequence parameter set, a picture parameter set, a tile group header, a slice header, a picture header, a tile header, a coding tree unit row, a coding unit, or a video data unit.

11. A non-transitory computer-readable storage medium storing instructions that cause a processor to:
determine, for a conversion between a current video block of a video and a bitstream of the video, whether an indication of a transform type in a multiple transform selection operation is included in the bitstream at least based on whether the current video block is coded using an intra block copy mode; and
perform the conversion based on the determining,
wherein the multiple transform selection operation comprises using a transform from a plurality of predefined transform candidates during the conversion,
wherein, in case that the current video block is coded using the intra block copy mode, the indication is excluded from the bitstream,
wherein, whether the indication is included in the bitstream is further based on a position of a last non-zero coefficient of the current video block,
wherein, whether to implicitly apply the multiple transform selection operation is based on whether the current video block is coded with a matrix-based intra prediction mode, wherein, whether the indication of the transform type in the multiple transform selection operation is included in the bitstream is at least based on a tree type of the current video block, and wherein, in response to the current video block being a chroma component that is partitioned using a dual tree from a coding tree unit, the indication is excluded from the bitstream, and when the indication is excluded from the bitstream, a value of the indication is inferred to be equal to a default value.

12. A non-transitory computer-readable recording medium storing a bitstream of a video which is generated by a method performed by a video processing apparatus, wherein the method comprises:

determining, for a current video block of the video, whether an indication of a transform type in a multiple transform selection operation is included in the bitstream of the video at least based on whether the current video block of the video is coded using an intra block copy mode; and generating the bitstream based on the determining, wherein the multiple transform selection operation comprises using a transform from a plurality of predefined transform candidates during the generating, wherein, in case that the current video block is coded using the intra block copy mode, the indication is excluded from the bitstream, wherein, whether the indication is included in the bitstream is further based on a position of a last non-zero coefficient of the current video block, wherein, whether to implicitly apply the multiple transform selection operation is based on whether the current video block is coded with a matrix-based intra prediction mode, wherein, whether the indication of the transform type in the multiple transform selection operation is included in the bitstream is at least based on a tree type of the current video block, and wherein, in response to the current video block being a chroma component that is partitioned using a dual tree from a coding tree unit, the indication is excluded from the bitstream, and when the indication is excluded from the bitstream, a value of the indication is inferred to be equal to a default value.

13. The non-transitory computer-readable recording medium of claim 12, wherein, in response to the indication being included in the bitstream, the indication is in a sequence parameter set, a picture parameter set, a tile group header, a slice header, a picture header, a tile header, a coding tree unit row, a coding unit, or a video data unit.

14. The non-transitory computer-readable storage medium of claim 11, wherein, in response to the indication being included in the bitstream, the indication is in a sequence parameter set, a picture parameter set, a tile group header, a slice header, a picture header, a tile header, a coding tree unit row, a coding unit, or a video data unit.

15. The method of claim 1, wherein, whether to implicitly apply the multiple transform selection operation is based on whether the current video block is coded with a differential coding mode, and wherein in the differential coding mode, residuals of samples of the current video block are represented in the bitstream using differences between quantized residuals and predictors of the quantized residuals.

16. The method of claim 15, wherein the differences are represented using a block based differential pulse coding modulation representation.

17. The apparatus of claim 9, wherein whether the indication is included in the bitstream is further based on at least one of a first syntax element in a sequence parameter set indicting whether the indication is allowed to present in the bitstream for an intra coding unit, or a second syntax element in a sequence parameter set indicting whether the indication is allowed to present in the bitstream for an inter coding unit.

18. The apparatus of claim 9, wherein, in response to a value of a third syntax element indicting a transform not applied to an associated transform block of the current video block, the indication is excluded from the bitstream.

19. The apparatus of claim 9, wherein the transform type of the multiple transform selection operation comprises a Discrete Cosine Transform Type II (DCT-II), a Discrete Sine Transform Type VII (DST-VII), or a Discrete Cosine Transform Type VIII (DCT-VIII).

20. The apparatus of claim 9, wherein for an intra block copy mode coded block, its prediction is derived from blocks of sample values of a same slice as determined by block vectors.

* * * * *